Aug. 30, 1960 F. A. MORRIS 2,950,801
READOUT CONTROL MEANS FOR SIGNAL-OPERATED TYPEWRITER
Original Filed April 13, 1953 15 Sheets-Sheet 1

INVENTOR.
FRANK A. MORRIS
BY George J. Seligsohn
ATTORNEY

DECODING RELAY CIRCUIT-7000

Aug. 30, 1960        F. A. MORRIS        2,950,801
READOUT CONTROL MEANS FOR SIGNAL-OPERATED TYPEWRITER
Original Filed April 13, 1953        15 Sheets-Sheet 10
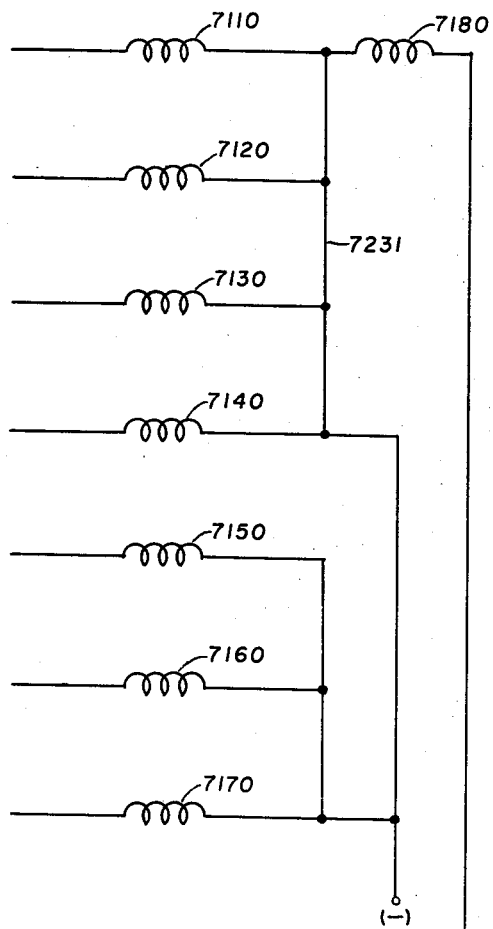
FIG. 10
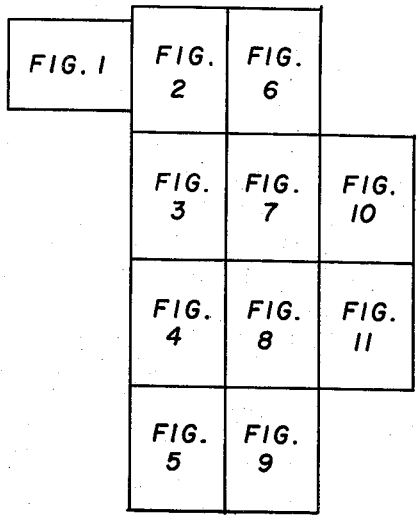
FIG. 12
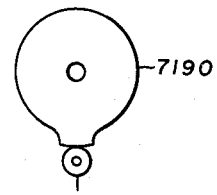
CLUTCH CAM Aug. 30, 1960  F. A. MORRIS  2,950,801
READOUT CONTROL MEANS FOR SIGNAL-OPERATED TYPEWRITER
Original Filed April 13, 1953  15 Sheets-Sheet 13

| CHARACTERS | PERMUTATION SLIDES ||||||| RELAY OPERATION |
| | 7110 | 7120 | 7130 | 7140 | 7150 | 7160 | 7170 | |
|---|---|---|---|---|---|---|---|---|
| 1 | + | | | | | | | 6700 |
| 2 | | + | | | | | | 6710 |
| 3 | | | + | | | | | 6720 |
| 4 | | | | + | | | | 6730 |
| 5 | | | | | + | | | 6740 |
| 6 | | | | | | + | | 6900 |
| 7 | | | | | | | + | 6910 |
| 8 | | | | | + | + | | 6920 |
| 9 | | | | | + | | + | 6930 |
| 0 | | | | | | + | + | 6940 |
| A | + | | | | + | | | 6700 + 6740 |
| B | + | | | | | + | | " + 6900 |
| C | + | | | | | | + | " + 6910 |
| D | + | | | | + | + | | " + 6920 |
| E | + | | | | + | | + | " + 6930 |
| F | + | | | | | + | + | " + 6940 |
| G | | + | | | + | | | 6710 + 6740 |
| H | | + | | | | + | | " + 6900 |
| I | | + | | | | | + | " + 6910 |
| J | | + | | | + | + | | " + 6920 |
| K | | + | | | + | | + | " + 6930 |
| L | | + | | | | + | + | " + 6940 |
| M | | | + | | + | | | 6720 + 6740 |
| N | | | + | | | + | | " + 6900 |
| O | | | + | | | | + | " + 6910 |
| P | | | + | | + | + | | " + 6920 |
| Q | | | + | | + | | + | " + 6930 |
| R | | | + | | | + | + | " + 6940 |
| S | | | | + | + | | | 6730 + 6740 |
| T | | | | + | | + | | " + 6900 |
| U | | | | + | | | + | " + 6910 |
| V | | | | + | + | + | | " + 6920 |
| W | | | | + | + | | + | " + 6930 |
| X | | | | + | | + | + | " + 6940 |
| Y | + | + | | | | | | 6700 + 6710 |
| Z | + | | + | | | | | " + 6720 |
| — | + | | | + | | | | " + 6730 |
| * CR | | + | | + | | | | 6710 + 6730 |

* Carriage Return

FIG. 14

Aug. 30, 1960                F. A. MORRIS                    2,950,801
             READOUT CONTROL MEANS FOR SIGNAL-OPERATED TYPEWRITER
Original Filed April 13, 1953                              15 Sheets-Sheet 14

United States Patent Office 2,950,801
Patented Aug. 30, 1960

2,950,801

READOUT CONTROL MEANS FOR SIGNAL-OPERATED TYPEWRITER

Frank A. Morris, Fishers, N.Y., assignor to General Dynamics Corporation, Rochester, N.Y., a corporation of Delaware Original application Apr. 13, 1953, Ser. No. 348,202, now Patent No. 2,886,642, dated May 12, 1959. Divided and this application Nov. 7, 1957, Ser. No. 695,031

7 Claims. (Cl. 197—19)

This invention, which is a division of copending patent application Serial No. 348,202, filed April 13, 1953, by Morris et al., now Patent No. 2,886,642, relates to improved data readout means and, more particularly, to steerout means for supplying automatically to a printer in a predetermined sequence each of a plurality of stored variable and fixed pieces of data.

In the field of data processing, it is often desired to produce a plurality of final printed data records which are identical with each other in format, but differ from each other in the specific information recorded. For instance, in the case of toll ticketing, the first two letters of the calling office code may be printed as the first line of every ticket, the calling subscriber's directory number may be printed as the second line thereof, the called office code and called subscriber's directory number may be printed as the third line thereof, the time of the call may be printed as the fourth line thereof, the date of the call may be printed as the fifth line thereof, the elapsed time of the call may be printed as the sixth line thereof, and the charge for the call may be printed as the seventh line thereof. Of course, the specific data contained in each of these items of information may vary from ticket to ticket, but each ticket contains all these items of information printed in the order stated above.

Although the present invention is incorporated as part of the printing control circuit of the toll ticketing system described and shown in the above-identified patent, it is not limited thereto, but may be employed in any data processing system in which a plurality of final records, all having the same format, are sequentially produced.

It is therefore an object of this invention to provide steerout control means for producing a plurality of different final records all of which have the same predetermined format.

It is a further object of this invention to provide steerout control means for automatically producing a final record a character at a time in accordance with a predetermined program to obtain a given format.

These and other objects and attendant advantages of the present invention will become more apparent from the following detailed description taken together with the accompanying drawings in which:

Figs. 1–11, inclusive, are a block and schematic diagram of a toll ticketing system incorporating the present invention;

Fig. 12 shows how Figs. 1–11 are to be joined;

Fig. 14 is a table showing the manner in which the operation of the printing control circuit translates received information to selectively operate a printer to print numerical and alphabetical characters, and Figs. 15 and 16 illustrate the manner in which the incoming data is applied to the printer through a stepping switch to obtain the predetermined format.

The entire toll ticketing system of which the present invention in part is described and shown in detail in the above-identified patent, and reference should be made thereto for a complete understanding of the entire toll ticketing system. Only as much of the toll ticketing system will be described herein as is necessary for an understanding of the present invention.

Figure 1:
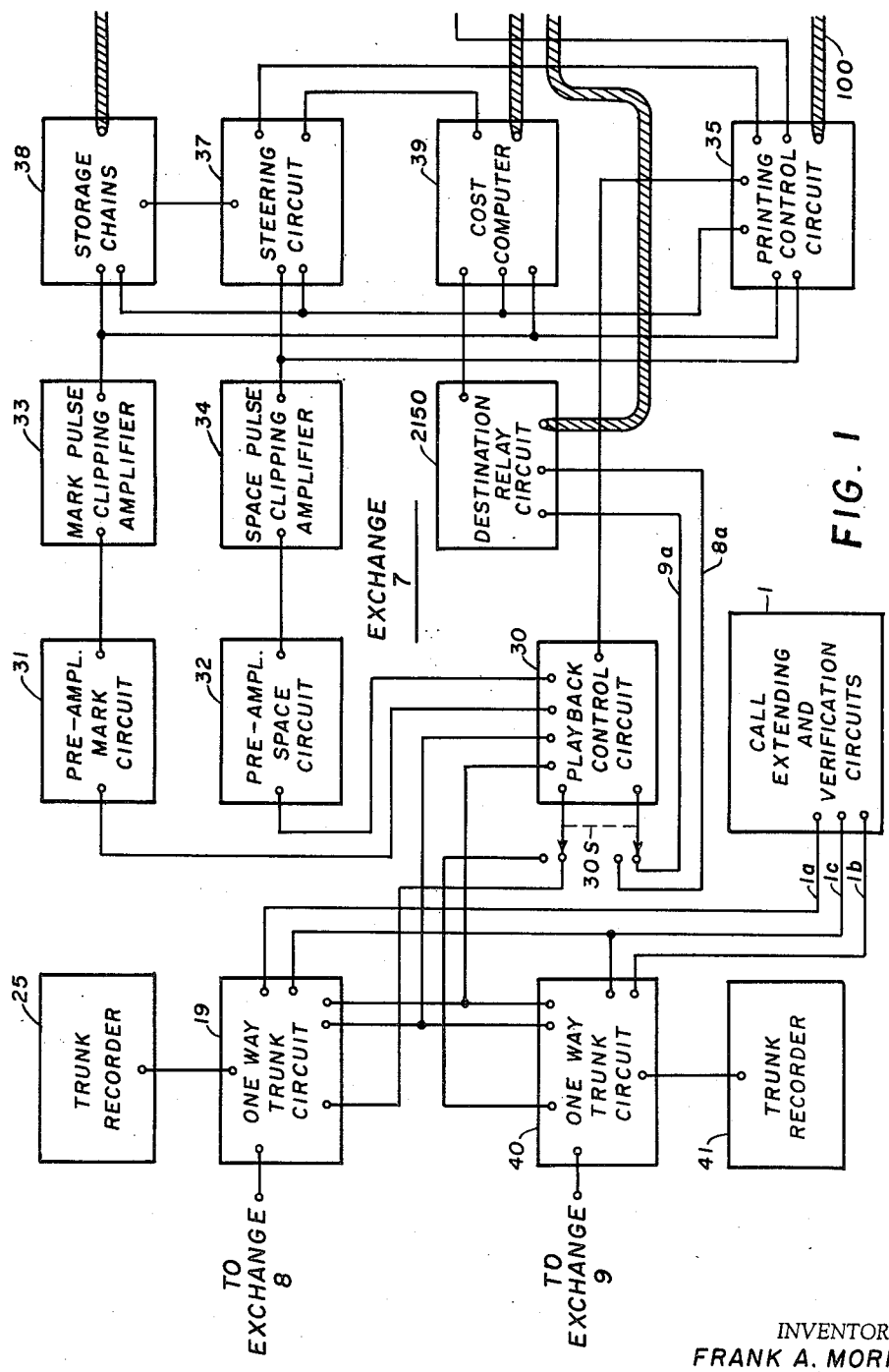

Referring now to Fig. 1, there is shown in block form some of the circuits located at an exchange 7, which provide toll ticketing facilities therefor. For purposes of background, the recording and playback portions of the toll ticketing system incorporating the present invention will be described briefly.

Recording

Assume first that a subscriber of exchange 7 wishes to call a subscriber of distant exchange 8. In this case, the calling subscriber dials a first predetermined access digit which operates call extending and verification circuits 1 to extend a connection over conductor 1a to one of a first group of one-way trunk circuits having access to exchange 8, such as one-way trunk circuit 19. Assume now that the calling subscriber wishes to dial a subscriber of exchange 9. In this case, he dials a second predetermined access digit which operates call extending and verification circuits 1 to extend a connection over conductor 1b to one of a second group of one-way trunk circuits having access to exchange 9, such as one-way trunk circuit 40. As shown, one-way trunk circuit 19 has associated therewith trunk recorder 25 which is individual thereto, and one-way trunk circuit 40 has associated therewith trunk recorder 41 which is individual thereto. In a like manner, all other one-way trunk circuits of exchange 7, not shown, have individual trunk recorders associated therewith.

After seizing a one-way trunk circuit having access to the distant exchange of the called subscriber, the calling subscriber successively dials each of the digits of his own directory number, which are forwarded over conductor 1a or 1b, as the case may be, to the proper one-way trunk circuit. The one-way trunk circuit forwards the received information of the directory number of the calling subscriber to its associated trunk recorder, where it is recorded in a manner described below. Also, the one-way trunk circuit returns this information to the verification portion of call extending and verification circuits 1 over conductor 1c in order to verify the calling subscriber's number. Should the verification be successful, the one-way trunk circuit operates to permit switch directing signals to be forwarded to the distant exchange.

The calling subscriber then successively dials the digits of the called subscriber's directory number. In response thereto, the one-way trunk circuit forwards this information to the distant exchange, where it is used to direct the operation of the automatic switches of the distant exchange, and also forwards this information to its associated trunk recorder, where it is recorded in the manner described below.

In response to an answer supervision signal being received from the distant office by the one-way trunk circuit, the recording of elapsed time of the call is initiated. The recording of elapsed time continues until the end of the conversation when the calling subscriber hangs up. Then, information as to the time and date of the call, from a clock-calendar circuit, not shown, is recorded in the associated trunk recorder. This is followed by the recording of an end-of-call code in the associated trunk recorder.

If the call is not completed for any reason, i.e., the calling subscriber hangs up without an answer supervision signal having been received, an end-of-call code is nevertheless recorded by the associated trunk recorder. In this case, however, no information as to elapsed time or the time and date of the call is recorded by the associated trunk recorder.

Figure 13:
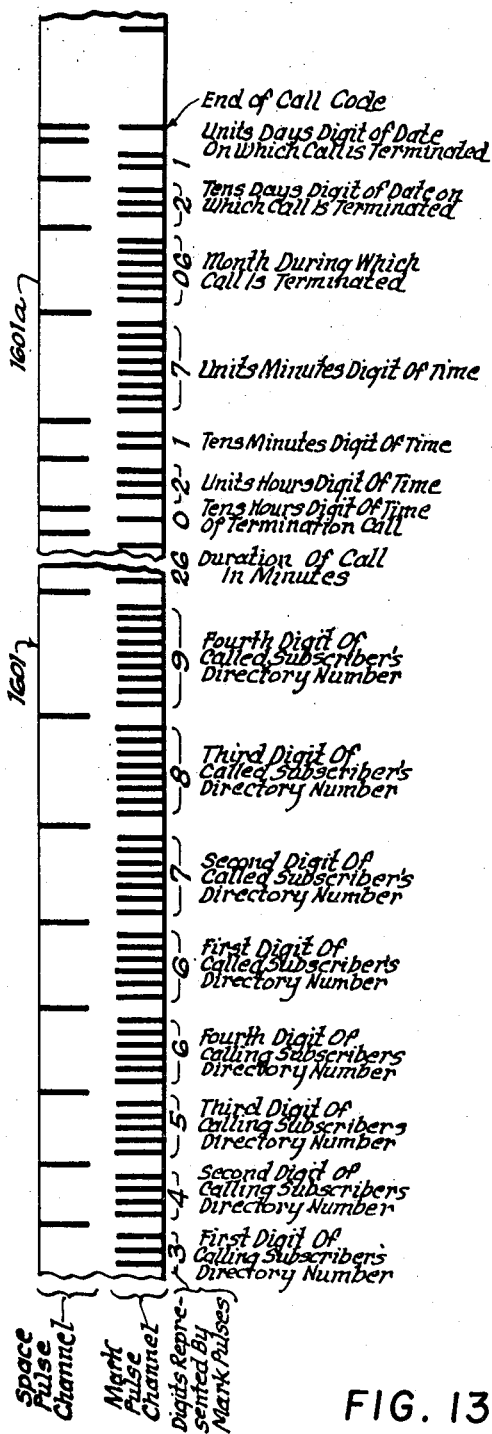
Fig. 13 is a magnetic tape preliminary record of a typical toll call made by the toll ticketing system.

Each trunk recorder individually associated with a one-way trunk circuit includes a two-channel endless magnetic tape. Reference is made to Fig. 13, which schematically illustrates the recording of a typical completed call. By way of example, this call assumes that the directory number of the calling subscriber is 3456, that the directory number of the called subscriber is 6789, that the duration of the call is twenty-six minutes, that the time of the call is 2:17 a.m., and that the date of the call is June 21.

In response to each pulse of the first dialed calling subscriber directory number, a mark pulse is recorded on the right-hand channel of the magnetic tape and the magnetic tape is moved a predetermined distance by the operation of a ratchet mechanism in the trunk recorder, to thereby provide three mark pulses in response to the first digit 3 of the calling subscriber's directory number, as shown in Fig. 13. During the interdigital time following the dialing of the first digit of the calling subscriber's directory number, the one-way trunk circuit operates to apply a space pulse which is recorded in the left-hand channel of the magnetic tape and the magnetic tape is moved forward a predetermined distance by the ratchet mechanism, as shown in Fig. 13. In a similar manner, each of the remaining digits of the calling subscriber's directory number and each of the digits of the called subscriber's directory number are recorded on the magnetic tape followed by a space pulse, as shown in Fig. 13. Thus, as can be seen from Fig. 13, each of the digits of the calling and called subscriber's directory numbers is represented by a series of mark pulses equal in number to the digit dialed, and successive mark pulse series are separated from each other by a space pulse.

In response to answer supervision being received, mark pulses are recorded once each minute during the length of the conversation to provide, for the call under discussion, a series of twenty-six mark pulses. When the calling subscriber hangs up, the one-way trunk circuit applies a space pulse to its associated trunk recorder which is recorded and then calls in a clock and calendar circuit, not shown. The clock and calendar circuit applies seven series of pulses manifesting the time and date of the call to the magnetic tape, each series being immediately followed by a space pulse, as shown in Fig. 13. Insofar as the mark pulses manifesting time and date only are concerned, each series, except the series manifesting months, includes one more pulse than the number which it designates, i.e., one pulse is used to represent zero, two pulses are used to represent 1, three pulses are used to represent 2, etc.

After the time and date information has been recorded, the one-way trunk circuit applies an end-of-call code to the magnetic tape, after which the tape is moved several times by the ratchet of the trunk recorder so as to separate the call under discussion from the beginning of the next uncompleted call on the tape. The end-of-call code consists of coincident mark and space pulses, as shown in Fig. 13.

Thus, it will be seen that in response to each completed call, sixteen separate items of information, each of which is immediately followed by a space pulse, plus an end-of-call code will be recorded on the magnetic tape of a trunk recorder, and that for each uncompleted call eight or fewer items of information plus an end-of-call code will be recorded on the magnetic tape. Furthermore, since each trunk recorder is individually associated with a specific one-way trunk circuit which is utilized in extending calls to a single predetermined distant office, the called office code of all calls recorded on the magnetic tape of any one trunk recorder is the same and is known. Also, the calling office code of exchange 7, from which all toll calls emanate, is the same and is known.

A discussion of the actual circuits contained in call extending and verification circuits 1 and the one-way trunk circuits, which are utilized in performing the above-described functions in making a magnetic tape recording of items of information pertaining to toll calls, is being omitted herein, since these circuits do not form part of the present invention. However, they are fully described and shown in the above-identified patent.

*Playback*

At stated intervals, such as once a day, a routine playback is made of all trunk recorders except those which may be busy with a call at the time of the routine playback. This routine playback, which is initiated automatically by the clock-calendar circuit, not shown, is under the control of printing control circuit 35 and playback control circuit 30. In response to the initiation of a routine playback cycle, playback control circuit 30 causes a first wiper of sequence switch 30s to move from a home position thereof to a first step position thereof which is associated with some one one-way trunk circuit. If this one-way trunk circuit is busy, the wipers of switch 30s are immediately moved to the second step position thereof associated with another one-way trunk circuit. However, if the first-mentioned one-way trunk circuit, associated with the first step position of switch 30s, is not busy, a playback of all the calls recorded on the magnetic tape of the trunk recorder associated with this one-way trunk circuit is commenced. First, under the control of playback control circuit 30, the magnetic tape is driven at high speed to a home position, and then, under the control of printing control circuit 35, is driven at low speed to effect the pickup of the recorded mark and space pulses, respectively. Each of the picked up mark pulses is passed through playback control circuit 30 and is then amplified successively by preamplifier mark circuit 31 and mark pulse clipping amplifier 33. Each picked up space pulse is passed through playback control circuit 30 and is then amplified successively by preamplifier space circuit 32 and space pulse clipping amplifier 34.

As shown in Fig. 1, stepping switch 30s of playback control circuit 30 also includes a second wiper which is used in selectively extending a connection to destination relay circuit 2150 over conductors 8a and 9a, respectively. This second wiper, as shown, is ganged with the first wiper used, as described above, in associating each one-way trunk circuit and its individual trunk recorder with playback control circuit 30. Thus, when one-way trunk circuit 19 is associated with playback control circuit 30, a connection is extended from playback control circuit 30 to destination relay circuit 2150 over conductor 8a, and when one-way trunk circuit 40 is associated with playback control circuit 30, a connection is extended from playback control circuit 30 to destination relay circuit 2150 over conductor 9a. A marking potential extended from playback control circuit 30 over conductor 8a is effective in selectively operating a first relay in destination relay circuit 2150. This first relay in destination relay circuit 2150 is also operated when playback control circuit 30 is associated with any other one-way trunk circuit in the first group which, like one-way trunk circuit 19, has access to exchange 8. In a similar manner, the association of playback control circuit 30 with one-way trunk circuit 40 and any other one-way trunk circuit in the second group having access to exchange 9 provides a marking potential from playback control circuit 30 to destination relay circuit 2150 over a conductor such as conductor 9a to selectively effect the operation of a second relay in destination relay circuit 2150. Destination relay circuit 2150 provides rate information to cost computer 39 in accordance with which one of its first and second relays is operated in any given case. Furthermore, destination relay circuit 2150 provides information to the printer as to the alphabetical designation of the called office code, as described more in detail below, in accordance with which one of its first and second relays has been operated.

In response to the magnetic tape having been driven to its home position under the control of playback control circuit 30, a signal is applied by playback control circuit 30 to printing control circuit 35, the magnetic tape is temporarily stopped, and further control over the drive of the magnetic tape is transferred to printing control circuit 35. This signal applied from playback control circuit 30 effects the operation of reset means within printing control circuit 35.

In response to the operation of this reset means, a reset signal is applied to storage chains 38, steering circuit 37 and cost computer 39. Storage chains 38 include a plurality of decade cold-cathode triode counting chains only one of which at any given time is enabled to count the number of mark pulses applied thereto. Steering circuit 37 includes a single cold-cathode triode counting chain and cost computer 39 includes a plurality of specialized cold-cathode counting chains utilized for counting elapsed time and nickles, dimes and dollars of billing charge.

After all the counting chains of storage chains 38, steering circuit 37 and cost computer 39 have been reset, steering circuit 37 applies an enabling potential to storage chains 38 which enables only the first counting chain therein to effect a count.

Following this reset operation, printing control circuit 35 causes drive of the magnetic tape to resume and actual playback of the recorded information to commence. The first series of mark pulses to be played back manifests the first digit of the calling subscriber's directory number of the first call recorded on the magnetic tape. After amplification, this first series is applied to storage chains 38, wherein the number of mark pulses therein is counted by the first chain, which is the only chain at this time enabled to effect a count. Following the transmission of the first series of mark pulses, a space pulse is played back and is applied, after amplification, to steering circuit 37 to operate the counting chain of steering circuit 37 to effect a count thereof. In response to this first count by the counting chain of steering circuit 37, the first counting chain of storage chains 38 is disabled from making any further count, although the count of the first series of mark pulses already therein is maintained thereby, and the second counting chain of storage chains 38 is enabled to effect a count. Thus, when the second series of pulses, manifesting the second digit of the calling subscriber's directory number of the first call recorded on the magnetic tape, is applied to storage chains 38, the number of pulses therein is counted by the second counting chain thereof. In a similar manner, the number of mark pulses in each successive series recorded on the magnetic tape will be stored in a separate counting chain of storage chains 38.

If the first call recorded on the magnetic tape is incomplete, no more than eight items of information, manifesting the directory numbers of the calling and called subscribers, will be recorded on the magnetic tape before an end-of-call code, as previously discussed. In this case, the counting chain of steering circuit 37 will have counted no more than eight space pulses, since each series of recorded mark pulses is followed by a space pulse. Under these conditions, the transmission of an end-of-call code will cause the operation of a coincidence circuit in printing control circuit 35. The operation of this coincidence circuit effects a temporary stoppage of the magnetic tape and a reset of storage chains 38, steering circuit 37 and cost computer 39, in a manner similar to that previously described in connection with the signal applied by play back control circuit 30 to printing control circuit 35. The storage circuits are then in condition to commence the playback of the second call recorded on the magnetic tape.

Assuming, however, that the first call on the magnetic tape is a completed call. In this case, instead of an end-of-call code, a ninth series of mark pulses, manifesting the elapsed time of the first call, follows the eighth space pulse, which operates a ring-connected ninth counting chain, manifesting unit minutes of elapsed time, of storage chains 38 and a tenth counting chain, manifesting tens minutes of elapsed time, which is coupled to the ninth chain. In addition, in response to the eighth space pulse, steering circuit 37 enables the counting chains of cost computer 39, which were previously disabled. Therefore, the ninth series of mark pulses, manifesting elapsed time, is not only counted by the ninth and tenth counting chains of storage chains 38, but also provides elapsed time information to cost computer 39. With this elapsed time information and the rate information provided by destination relay circuit 2150, described above, cost computer 39 is capable of providing an output manifesting the total charge for the call in question.

Following the playback of the ninth series of mark pulses, a ninth space pulse is transmitted to and counted by the counting chain of steering circuit 37. In response thereto, the eleventh counting chain of steering chains 38 is enabled and the counting chains of cost computer 39, which were enabled in response to the eighth space pulse, are disabled, so that the playback of the mark pulse series subsequent to the ninth series have no effect on cost computer 39.

The tenth to thirteenth series of mark pulses, manifesting terminating time information of the call, are sequentially stored in the eleventh to fourteenth counting chains, respectively, of storage chains 38, in the same manner as previously described in connection with the first eight series of mark pulses.

The fourteenth series of mark pulses, manifesting the month of the call, is stored in a fifteenth ring-connected counting chain and a sixteenth counting chain coupled thereto of storage chains 38, representing units and tens months, respectively. The fifteenth and sixteenth series of mark pulses, manifesting date of the call, are stored in seventeenth and eighteenth counting chains of storage chains 38, respectively.

Immediately following the storage of the sixteenth series of mark pulses in the eighteenth counting chain of storage chains 38, the sixteenth space pulse is applied to and counted by the counting chain of steering circuit 37. The receipt of this sixteenth space pulse by steering circuit 37 is an indication that all sixteen items of a completed call have been stored in storage chains 38. Therefore, in response to steering circuit 37 having counted sixteen space pulses, a call complete signal is applied from steering circuit 37 to printing control circuit 35. This call complete signal conditions printing control circuit 35 to effect the printing of a toll ticket, rather than effecting a reset operation, in response to the transmission of an end-of-call code. Thus, in response to the playback of the end-of-call code following the sixteenth space pulse, printing control circuit 35 temporarily stops the drive for the magnetic tape, in the same manner as for an uncompleted call, but instead of initiating a reset of storage chains 38, steering circuit 37 and cost computer 39, as in the case of an uncompleted call, the receipt of an end-of-call code, in the case of a completed call, initiates the printing of a toll ticket.

A discussion of the actual circuits contained in the one-way trunk circuits, playback control circuit 30, printing control circuit 35, destination relay circuit 2150, preamplifier mark circuit 31, preamplifier space circuit 32, mark pulse clipping amplifier 33, space pulse clipping amplifier 34, steering circuit 37, storage chains 38, and cost computer 39, which are utilized in performing the above-described functions in playing back a magnetic tape, is being omitted herein, since these circuits do not form part of the present invention. However, they are fully described and shown in the above-identified patent.

Readout

The means for reading out the information stored in storage chains 38 and cost computer 39, which includes the steerout control means of the present invention, is shown schematically in Figs. 2–11, inclusive.

In response to the receipt of an end-of-call code following the items of information of a completed call, printing control circuit 35 applies ground to conductors 101 and 102 of cable 100. The application of ground to conductor 101 is effective in operating first prepare-to-read relay 5020 through a connection extending from printing control circuit 35, conductor 101, the winding of first prepare-to-read relay 5020 to grounded battery. In response to the operation of first prepare-to-read relay 5020, an energization path is completed for second prepare-to-read relay 5030, which extends from ground through operated contacts 5022, the winding of second prepare-to-read relay 5030 to grounded battery. In response to the energization thereof, second prepare-to-read relay 5030 operates.

In addition, the operation of the first prepare-to-read relay 5020 prepares a path for energizing the switch relay 5010 through contacts 5021 and the motor magnet 4950 of the stepping switch 5100 through contacts 5011 of switch relay 5010 so that the items of information in the storage chains 38 and the cost computer 39 may be sequentially removed to operate the decoding relay circuit 7000 and the internal printer control circuit 7100.

At this time, the printing control circuit 35 has completed all of the necessary operations preparatory to initiating sequential operation of the stepping switch 5100 to successively transfer the registered items of information to the decoding relay circuit 7000 wherein the information is translated into the selective operation of one or a group of control elements in the internal printer control circuit 7100 which controls the operation of a printer. This printer may be of the commercial type sold under the name of "Flexowriter" by the Commercial Controls Corporation of Rochester, New York, which includes an electric typewriter which may be operated either directly by means of a normal keyboard or indirectly by means actuated in response to signals applied thereto.

In general, the stepping switch 5100 is advanced in a step-by-step manner under the control of the motor magnet 4950 which is intermittently energized by the internal printer control circuit 7100. This control circuit energizes the motor magnet 4950 at fixed intervals of time to step the switch 5100 into engagement with the contacts forming different stepping positions so that the registered information is sequentially transferred to the decoding relay circuit 7000. The decoding relay circuit 7000 translates the information, which is registered in the storage chains 38 and the cost computer 39 in a decimal numerical form, into a coded form adapted for controlling the operation of the signal-actuated means of the printer.

The stepping switch 5100 includes a plurality of contact decks 5420, 5440, 5800, 5820, 5840, 6200, 6220, 6240, 6600, 6620, and 6640, the contacts of which are engaged by the wipers 5430, 5450, 5810, 5830, 5850, 6210, 6230, 6250, 6610, 6630 and 6650, respectively. The banks 5440, 5800, 5820, 5840, 6200, 6220, 6240, 6600, 6620, and 6640 are used for transmitting information to the decoding relay circuit 7000 and are designated as "1" to "9", inclusive, and "0". The contact bank 5420 is used for control purposes as will be described hereinafter. Each of the information transmitting contact banks includes 42 contact points or stepping positions in which the first of these acts as a home position. Since each of the 42 contact points in each of the contact decks is sequentially engaged by its associated wiper, the 42 contact points provide means for transmitting 42 separate items of information to the decoding relay circuit 7000, and, consequently, to produce 42 different printing or control operations by the printer.

Figure 16:
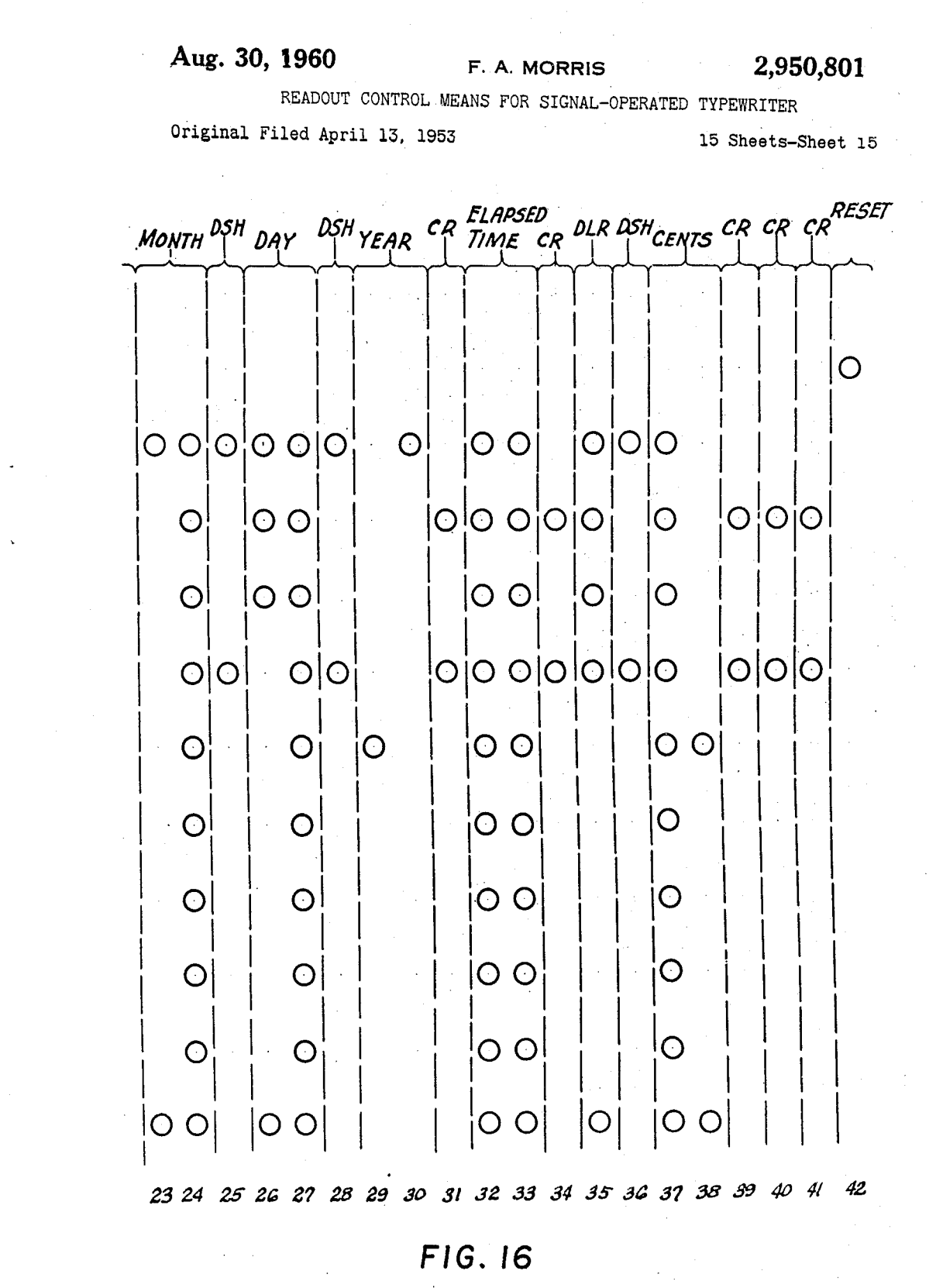

As disclosed in Figs. 15 and 16 of the drawings, all of the contacts in each of the stepping positions of the switch 5100 are connected to the same source of information. For instance, in the fifth stepping position of the switch 5100, the fifth contact in each of the plurality of information transmitting contact banks is connected to the output anode of one of the counting tubes forming the first counting chain of storage chains 38 wherein is registered the first digit of the calling subscriber's directory number. More particularly, the fifth contact in the first contact bank, i.e., bank 5440, is connected to the "1" manifesting tube of this first counting chain and the fifth contact in the second contact bank, i.e., bank 5800, is connected to the "2" manifesting tube thereof. In a like manner, the fifth contacts in the third, fourth, fifth, sixth, seventh, eighth, ninth and zero contact banks, are connected to like designated manifesting tubes in the first counting chain of storage chains 38. Therefore, when the wipers move into engagement with the ten contacts in the fifth stepping position of the switch 5600, the output of all of the counting tubes forming this first counting chain are interconnected with the wipers of the stepping switch 5100. Since only a single tube is energized in any of the storage chains 38 at any given time, one of the contacts in the fifth stepping position is grounded so that ground is applied to the wiper in engagement therewith for the purpose of operating a relay in the decoding relay circuit 7000.

Certain of the contacts in the plurality of contact banks associated with the stepping switch 5100 are not provided with information from either the cost computer 39 or the plurality of storage chains 38. For instance, as shown in Fig. 15 of the drawings, it is desired to insert a carriage return operation of the printer before producing a printed indication of the first digit of the directory number of the calling subscriber. Therefore, the fourth contacts in the second and fourth contact banks are wired directly to ground so that ground is applied to the wipers 5810 and 5850. The selective grounding of these two wipers controls the decoding relay circuit 7000 and the internal printer control circuit 7100 to produce a carriage return operation in the printer.

Other information such as the alphabetical designation of the called exchange, is coupled to the stepping switch 5100 by the selective operation of one of the destination relays in destination relay circuit 2150, as described hereinabove. The operation of either one of these destination relays grounds a plurality of conductors and these conductors extend to contacts in the tenth and eleventh stepping positions of the switch 5100 (Fig. 15). For instance, if one destination relay represents a called exchange which is designated by the alphabetical characters "EB," the tenth contacts in the first and ninth contact banks, i.e., contact banks 5440 and 6620, are grounded. In the eleventh stepping position, i.e., the eleventh contacts in the first and sixth contact banks, i.e., banks 5440 and 6220, are grounded. These grounded contacts operate the decoding relay circuit 7000 and the internal printer control circuit 7100 to operate the printer to produce the character "E" and "B" when the wipers of the switch 5100 sequentially engage the contacts forming the tenth and eleventh stepping positions. If the other destination relay represents a called exchange which is designated by the alphabetical characters "PI," other contacts in the tenth and eleventh stepping positions are grounded to operate the printer to produce these letters.

In summary, therefore, the stepping switch 5100 together with its associated circuitry provides a means for selectively interconnecting the decoding relay circuit 7000, with the plurality of sources of information pertaining to a single toll call. The stepping switch 5100 selectively interconnects the decoding relay circuit 7000 with the cost computer 39, the storage chains 38, the destination relay circuit 2150, and selectively grounded contacts in the contact banks of the stepping switch 5100.

The decoding relay circuit 7000 is interposed between the stepping switch 5100 and the internal control circuit 7100 of the printer. The purpose of the decoding relay circuit 7000 is to convert the information registered in the storage chains 38 and the cost computer 39 in a decimal numerical form into the selective operation of one or more of a plurality of permutation slide operating magnets 7110, 7120, 7130, 7140, 7150, 7160 and 7170 to control the operation of the printer. The decoding relay circuit 7000 in addition to receiving items of information from the storage chains 38 and the cost computer 39 receives certain information which is wired into the banks of contacts associated with the stepping switch 5100 and also utilizes this information to produce a selective operation of one or more of the plurality of permutation slide operating magnets in the control circuit 7100.

The decoding relay circuit 7000 decodes this information by selectively operating one or more of the relays comprising this circuit to selectively prepare one or more circuits extending to the magnets 7110, 7120, 7130, 7140, 7150, 7160 and 7170. The decoding relay circuit also completes a circuit for extending ground from the printing control circuit 35, through a portion of the internal printer control circuit 7100 to the prepared paths for operating the permutation slide magnets 7110, 7120, 7130, 7140, 7150, 7160 and 7170.

The decoding relay circuit 7000 includes a plurality of decoding relays 6700, 6710, 6720, 6730, 6740, 6900, 6910, 6920, 6930 and 6940 which are connected to the wipers 5450, 5810, 5830, 5850, 6210, 6230, 6250, 6610, 6630 and 6650 through a plurality of contacts 6715, 6815, 6825, 6835, 6945, 6905, 6915, 7025, 7035 and 7045, respectively. The operating windings of all of these decoding relays are connected at one side to positive battery so that, when ground is applied to the wiper connected to the other side of these windings, these relays are operated.

As shown in Fig. 14 of the drawings, only a single decoding relay in the circuit 7000 is operated in response to information representative of a numerical character. Since all of the information stored in the plurality of storage chains 38 and the cost computer 39 is of a numerical nature, and since each of the numerically designated tubes therein is connected to like positioned contacts in different contact banks associated with the stepping switch 5100, a single decoding relay representative of a particular digit is operated in response to the movement of its associated wiper into engagement with a contact which is connected to a conductive tube in one of the storage chains 38 or the cost computer 39.

As disclosed in Fig. 14 of the drawings, more than one of the relays in the decoding circuit 7000 is operated in response to information representative of either an alphabetical character or a control operation. It is possible to operate two of the relays in the decoding relay circuit 7000 in response to information representative of alphabetical characters or control operations inasmuch as this information is not received from one of the storage chains 38 or the cost computer 39, but is provided by prewiring certain of the contacts associated with the stepping switch 5100 to ground, or by selectively grounding those contacts under the control of the destination relays of destination relay circuit 2150.

The decoding relay 6700, in operating, closes two pairs of contacts 6701 and 6702. The closure of the contacts 6701 connects the ground provided by the operation of the switch relay 5010 to a normally closed pair of contacts 7201 in the internal printer control circuit 7100. The closure of the contacts 6702 conditions a circuit for applying ground from a clutch contact 7250 through the contacts 6702 to the permutation slide operating magnet 7110.

The selective operation of the relays 6710, 6720, 6730, 6740, 6900 and 6910 selectively closes a group of circuit conditioning contacts 6711, 6721, 6731, 6741, 6901 and 6911, and a plurality of contacts 6712, 6722, 6732, 6942, 6902 and 6912, for operating the slide magnets in the circuit 7100. The operation of the relay 6920 closes a pair of ground circuit conditioning contacts 6921 and a plurality of permutation slide controlling contacts 6922 and 6923. The decoding relay 6930, in operating, closes a pair of ground circuit conditioning contacts 6931 and a plurality of slide magnet operating contacts 6932 and 6933. The decoding relay 6940, in operating, closes a single pair of ground circuit conditioning contacts 6941 and a plurality of permutation slide magnet controlling contacts 6942 and 6943. Therefore, the operation of any one of the decoding relays 6700, 6710, 6720, 6730, 6740, 6900 and 6910 closes one pair of ground circuit conditioning contacts and one pair of slide magnet operating contacts, whereas the operation of any one of the three decoding relays 6920, 6930 and 6940, in addition to closing a single pair of ground circuit conditioning contacts, closes two pairs of contacts completing circuits extending to two permutation slide operating magnets in the control circuit 7100.

Accordingly, the decoding relay circuit 7000 converts information electronically manifested in the storage chains 38 and the cost computer 39 in the form of a decimal numerical notation into the selective conditioning of circuits for simultaneously operating one or more of the permutation slide operating magnets. Also, this decoding circuit translates information prewired to the banks of contacts of the stepping switch 5100 or manifested by contacts selectively grounded under the control of the destination relays into the selective operation of one or more than one decoding relay resulting in the operation of one or more of the permutation slide magnets in the internal printer control circuit 7100.

The printer utilized in the toll ticketing facilities is similar to conventional electric typewriters, such as the "Flexowriter," which may be selectively operated under the control of either a manual keyboard or a plurality of permutation slide controlling magnets. As shown, the printer is selectively operated under the control of the plurality of permutation slide controlling magnets 7110, 7120, 7130, 7140, 7150, 7160 and 7170 to provide a plurality of printed tickets, each of which includes among others the items of information pertaining to one toll call which are selectively registered in the storage chains 38 and the cost computer 39, and thereafter, transmitted through the stepping switch 5100 and the decoding relay circuit 7000.

The printer includes an internal control circuit 7100 (Figs. 10 and 11) which not only selectively prints the desired characters under the control of the registered information, but also controls the intermittent movement of the stepping switch 5100 so that the information is only transferred to the printer at a speed at which this printer is able to utilize the information to produce a printed record. In general, the printer includes seven permutation slides which are selectively operated under the control of the plurality of permutation slide operating magnets 7110, 7120, 7130, 7140, 7150, 7160 and 7170. These operating magnets are selectively energized under the control of the decoding relay circuit 7000 and when energized, release their respectively controlled permutation slides so that these slides move into released positions under the control of a spring means.

Simultaneously with operating a selected number of these permutation slide operating magnets, a clutch magnet 7180 is energized to engage a one revolution clutch. The operation of this clutch engages a drive roll (not shown) with a motor (not shown) so that this drive roll makes a single complete revolution before being declutched. During this complete cycle of rotation, the drive roll actuates a conventional type bar to print a single numerical or alphabetical character or to perform a control operation in accordance with the selective position of the permutation slides. Also during the single cycle of rotation, the drive roll mechanically returns all of the released permutation slides against the action of the spring means to a normal latched position so that these permutation slides may thereafter be selectively released to set up another character to be printed under the control of the decoding relay circuit 7000.

Figure 11:
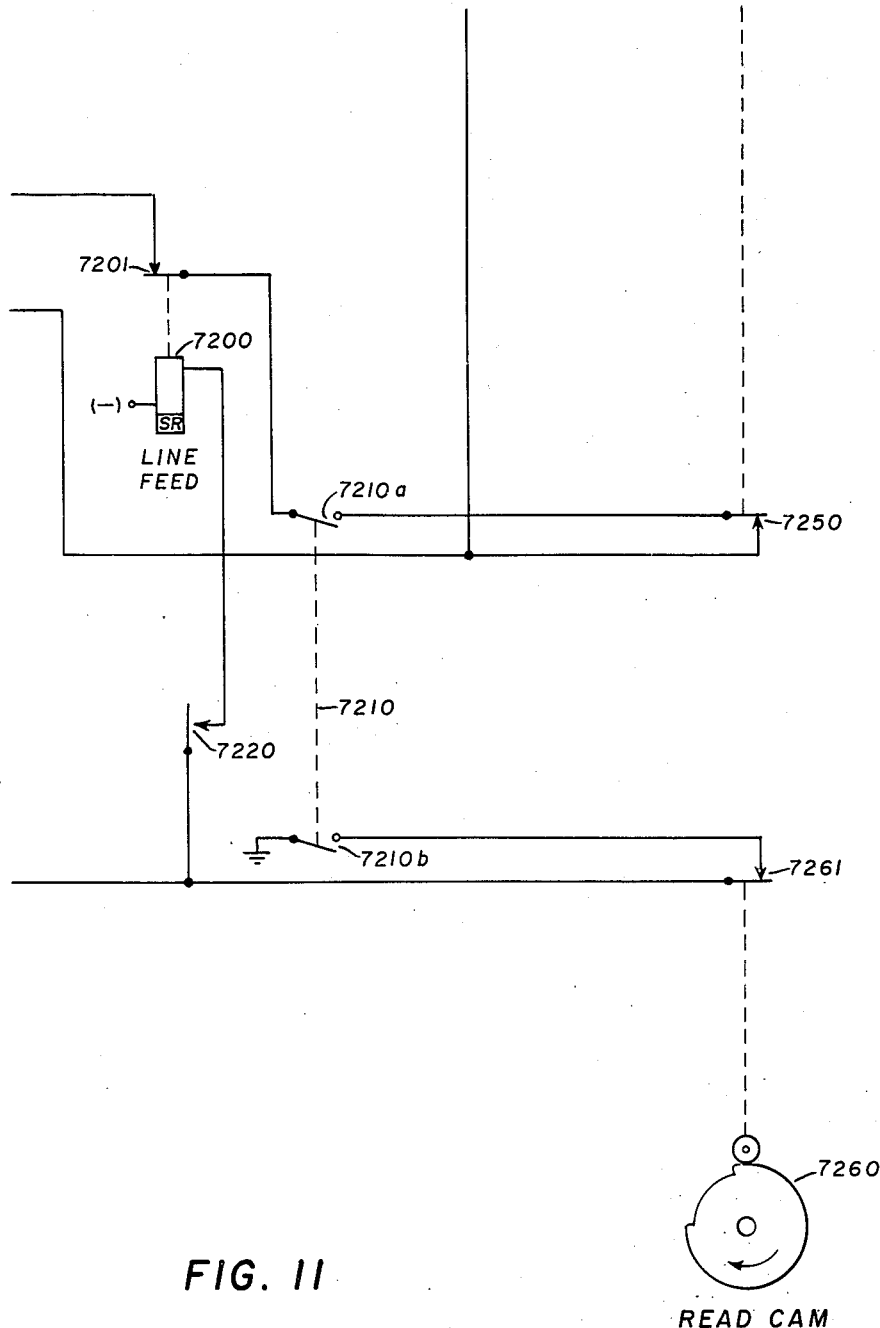

At the end of each cycle of revolution, a clutch cam 7190 and a read cam 7260 which are carried on the drive roll are moved to the positions shown in Figs. 10 and 11 of the drawings. In this normal position, the clutch cam 7190 closes a pair of contacts 7250 and the read cam 7260 closes a pair of contacts 7261. When the contacts 7261 are closed under the control of the read cam 7260, a circuit may be completed by the operation of the prepare-to-read relay 5020 for applying ground to the operating winding of the switch relay 5010 from a grounded and closed pair of contacts 7210b of a manually operated switch 7210 which is closed either manually or automatically to initiate operation of the printer. This application of ground operates the switch relay 5010 to interconnect the stepping switch 5100 with the decoding relay circuit 7000.

When the contacts 7250 are closed, ground is applied through from the contacts 7201 through a pair of contacts 7210a, the closed contacts 7250 to operate both the conditioned permutation slide operating magnets and the one revolution clutch magnet 7180. The application of ground to the contacts 7201 is controlled by both the decoding relay circuit 7000, the second prepare-to-read relay 5030 and the switch relay 5010.

Since a cycle of operation of the printer is initiated with the cams 7190 and 7260 in the positions shown in the drawings, the application of ground from the printing control circuit 35 through the control circuit 7100 to the decoding relay circuit 7000 grounds the selectively closed contacts therein to operate a selected group of the permutation magnets thereby to condition a particular type bar for movement under the control of the drive roll. Simultaneously with energizing the selected group of permutation magnets, the one-way clutch magnet 7180 is energized to connect the drive roll with the motor in the printer. The initial rotation of the drive roll opens the contacts 7261 so that the motor magnet 4950 is released and the stepping switch 5100 is advanced to advance the plurality of wipers into engagement with the contacts forming the next stepping position and to disconnect the stepping switch 5100 from the decoding relay circuit 7000.

Immediately following the opening of the contacts 7261, the cam 7190 is rotated to open the contacts 7250 whereby ground is removed from the permutation magnets and from the one-way clutch magnet. During the following revolution, the drive roll prints the selected character and returns the plurality of permutation slides to their normal locked position. Following the first quarter of the revolution, the read cam 7260 again closes the contacts 7261 to operate the switch relay 5010, whereby the relays in the decoding relay circuit 7000 are operated in accordance with the information transferred thereto from the wipers of the stepping switch 5100 which are now in engagement with the contacts forming the next succeeding stepping position. The original movement of the wipers into engagement with the contacts does not operate the relays in the decoding relay circuit 7000 inasmuch as the path thereto is interrupted by the release of the switch relay 5010.

During the continuing rotation of the drive roll, the two cams 7260 and 7190 are rotated until such time as these cams are almost returned to their normal position. At this time, the clutch cam 7190 recloses the contacts 7250 so that the permutation magnets are reoperated in accordance with the information provided by the selective operation of the decoding relays in the decoding relay circuit 7000. At this time the clutch magnet 7180 is again energized so that the drive roll is connected through the one revolution clutch to the motor in the printer to initiate a similar cycle of operation. It should be noted that if none of the relays in the decoding circuit 7000 are operated, ground is not applied to the clutch operating magnet 7180, as explained in more detail hereinafter. Therefore, a new cycle of operation is not initiated unless one of the relays in the decoding relay circuit 7000 is operated to indicate that an additional item of information is to be printed.

After the read cam 7260 moves past the normal or home position, in response to a reenergization of the one revolution clutch magnet 7180, the switch relay 5010 is released to interrupt the operating paths of the plurality of relays in the decoding circuit 7000 and to release the motor magnet 4950 to move the stepping switch 5100 an additional step, thereby to condition the stepping switch 5100 to transmit the next item of information to the decoding relay circuit 7000 in response to a reoperation of the switch relay 5010.

The internal printer control circuit 7100 is also provided with a carriage return line feed relay 7290 which is selectively operated under the control of a switch 7220. The switch 7220 is closed to operate the slow-to-release relay 7200 in response to a carriage return movement of the carriage of the printer wherein the carriage moves to the left marginal position. The carriage return movement of the printer is also accompanied by a plurality of line feed operations whereby the tape material supplied to the printer is advanced a distance equal to three lines. To insure that the operation of the printer is not reinitiated until such time as the three line feed operations are completed, the relay 7200 remains operated for a time determined by its operating characteristics so that the contacts 7201 are held open. When the contacts 7201 are open, ground cannot be applied to the one revolution clutch magnet 7180 or through the decoding relay circuit 7000 to the permutation slide operating magnets 7110, 7120, 7130, 7140, 7150, 7160 and 7170. Therefore, the operation of the slow-to-release relay 7200 in response to a carriage return operation insures that the paper feed operations coincident thereto are completed before the next cycle of operation of the printer can be initiated.

In general, therefore, the internal printer control circuit 7100 selectively operates the printer in accordance with the position of the plurality of permutation slides controlled by the magnets 7110, 7120, 7130, 7140, 7150, 7160 and 7170. The circuit 7100 includes the clutch magnet 7180 which is energized in response to the operation of one or more of the permutation slide operating magnets and, when operated, mechanically engages a one-revolution clutch so that the cams 7190 and 7260 are rotated through one complete cycle of revolution during which the selected character is printed and during which the released permutation slides are mechanically returned to their normal latched position.

As the read cam 7260 moves beyond its normal position shown in Fig. 11 of the drawings, ground is removed from the previously operated switch relay 5010 and motor magnet 4950 so that the motor magnet 4950 permits the plurality of wipers associated with the stepping switch 5100 to be moved into engagement with the contacts forming the next stepping position. After approximately one-quarter of a revolution, the switch relay 5010 and the motor magnet 4950 are operated under the control of the read cam 7260. The operation of the switch relay 5010 interconnects the wipers of the stepping switch 5100 with the operating windings of the decoding relays in the decoding relay circuit 7000 so that one or more of these relays are operated to prepare one or more paths for operating one or more of the permutation slide operating magnets in the internal printer control circuit 7100. The operation of the motor magnet 4950 prepares the wipers of the stepping switch 5100 for movement into engagement with the contacts forming the next adjacent stepping position. During the remainder of the single cycle of revolution, the drive roll prints the previously selected character and returns the permutation slides to their normal latched position. As the cam 7190 approaches its normal position shown in Fig. 10 of the drawings, ground is applied to the previously prepared circuits for operating selected ones of the slide operating magnets thereby to select the next character for printing. Also, this movement of the clutch cam 7190 applies ground to the operating winding of the clutch magnet 7180 to reengage the one-revolution clutch for another cycle of revolution in which the internal printer control circuit 7100 operates as described above.

During the production of a toll ticket by the printer, the switch relay 5010 and the motor magnet 4950 are operated under the control of the internal printer control circuit 7100. The intermittent operation of these elements is initiated in response to the operation of the first and second prepare-to-read relays 5020 and 5030 which, as described hereinabove, conditions the plurality of storage chains 38 and the cost computer 39 for transmitting the information registered therein through the stepping switch 5100 to the decoding relay circuit 7000. In its normal position, the plurality of wipers associated with the stepping switch 5100 are in engagement with the contacts forming the first stepping position. Accordingly, the operation of the first prepare-to-read relay 5020 to close the contacts 5021 completes a circuit for applying ground to the operating winding of the switch relay 5010. This circuit extends from ground through the closed contacts 7210b, 7261, 5021 to and through the operating winding of the switch relay 5010 to grounded battery. The operation of the switch relay 5010 closes the contacts 6715, 6815, 6825, 6835, 6945, 6905, 6915, 7025, 7035, 7045, 5011 and 5012. The closure of the contacts other than the contacts 5011 and 5012 interconnects the wipers of the stepping switch 5100 with the operating windings of the decoding relays in the decoding relay circuit 7000.

Figure 2:
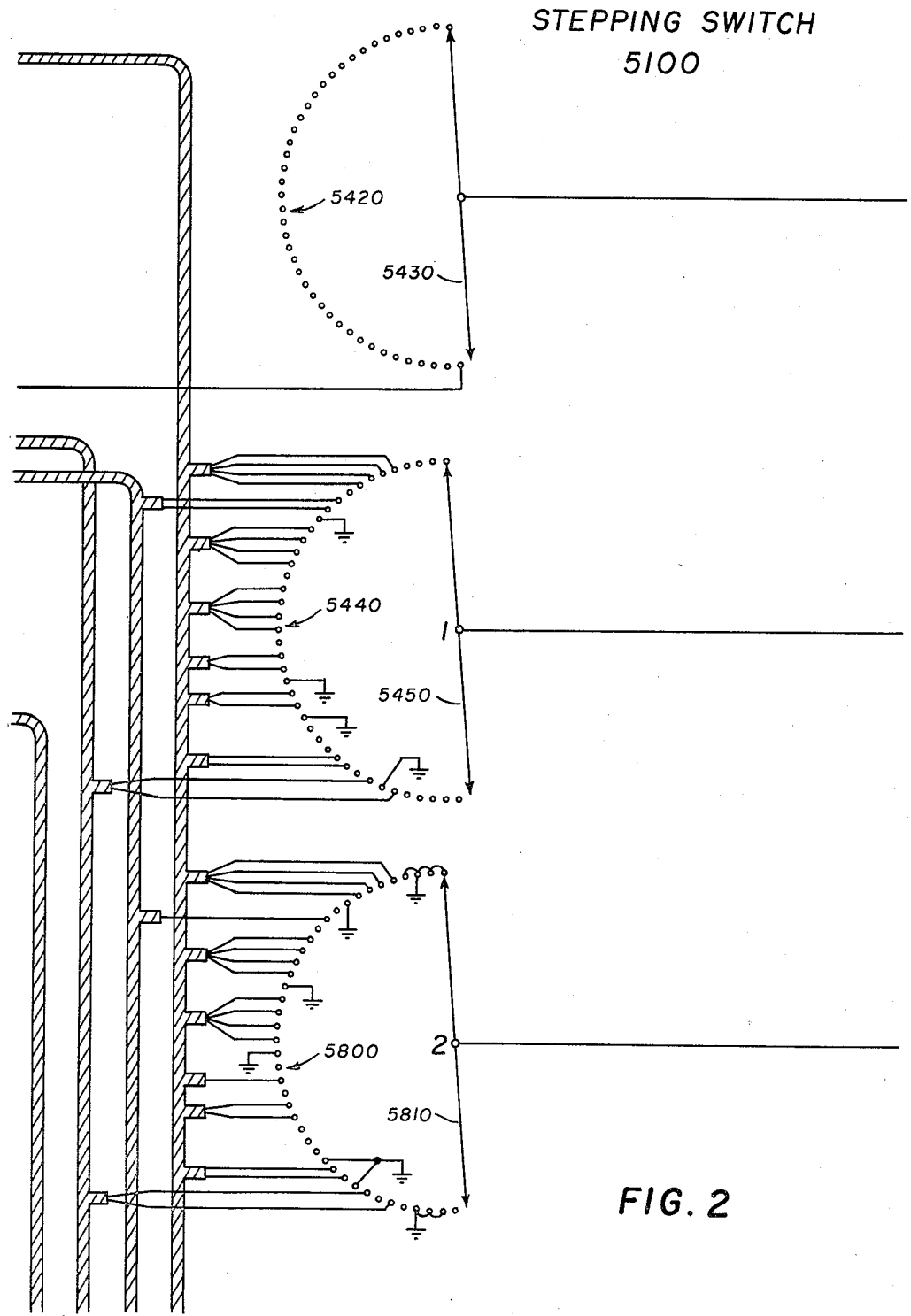
Figure 3:
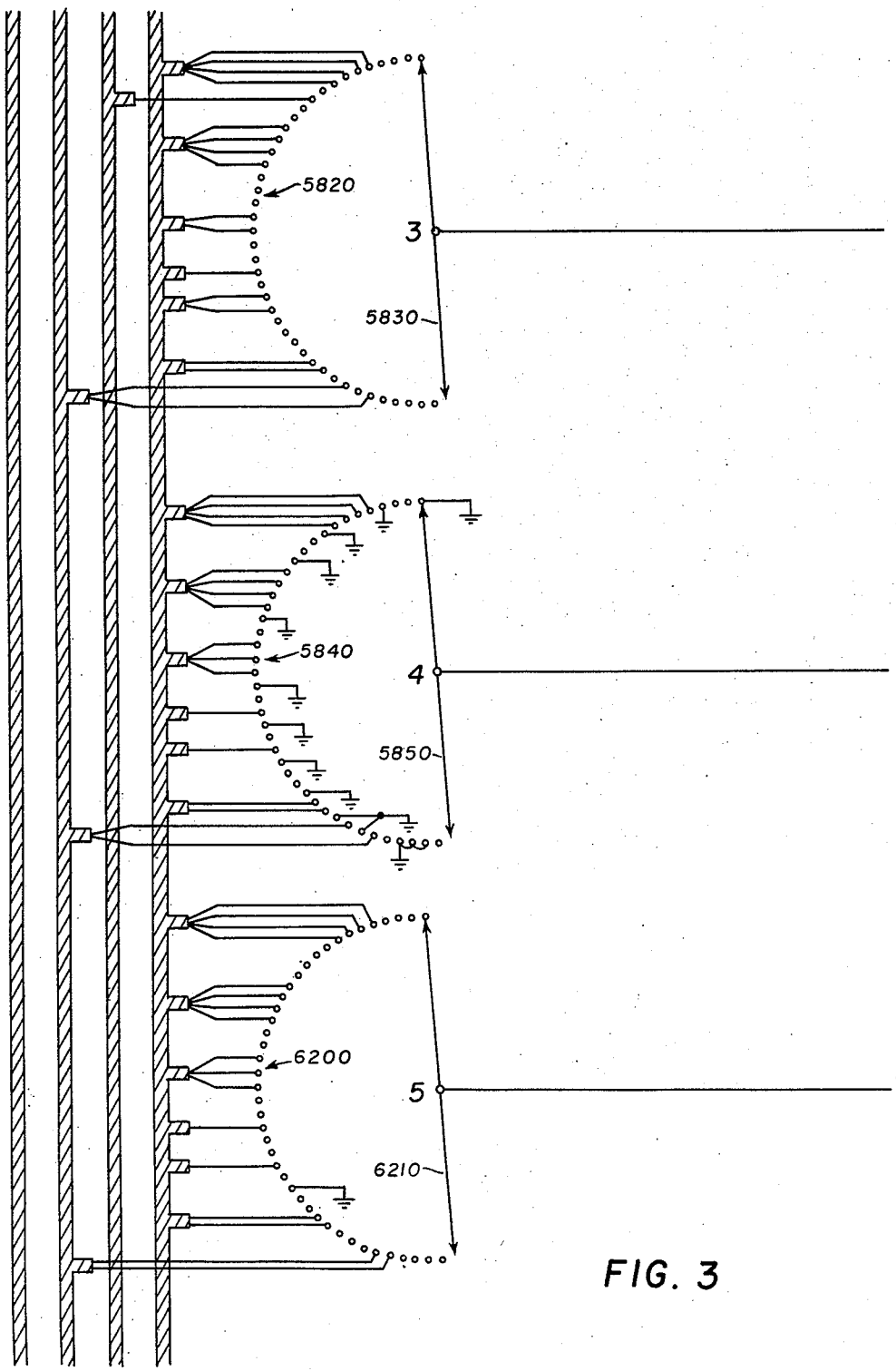

As shown in Figs. 2 and 3 of the drawings, in the first stepping position, the contacts in the second and fourth contact banks are wired directly to ground so that the wipers 5810 and 5850 are grounded. The ground applied to the wiper 5810 is transmitted through the closed contacts 6815 and is applied to the operating winding of the decoding relay 6710 to operate this relay. The operation of the relay 6710 closes the contacts 6711 and 6712. The closure of the contacts 6712 prepares a path for operating the permutation slide operating magnet 7120. The ground applied to the wiper 5850 is transmitted to the operating winding of the decoding relay 6730 through the closed contacts 6835 to operate this relay. The operation of the relay 6730 closes the contacts 6731 and 6732. The closure of the contacts 6732 prepares an operating circuit for the permutation slide operating magnet 7140.

The closure of the contacts 6711 and 6731 completes the conditioned paths for operating the magnets 7120 and 7140. This path extends from a battery conductor 7231 through the operating windings of the magnet 7120 and 7140, the closed contacts 7250, 7210a, 7201, 6711 or 6731, 5031, 5012 to grounded conductor 102 of cable 100. The operation of the magnets 7120 and 7140 releases their respectively controlled permutation slides so that, as shown in Fig. 14 of the drawings, a carriage return operation is initiated by the printer.

Also, the closure of the contacts 6711 and 6731 completes a circuit for energizing the clutch magnet 7180 so that the drive roll carrying the cams 7190 and 7260 is engaged with the drive motor of the printer. This circuit extends from the battery conductor 7231 through the operating winding of the clutch magnet 7180, the closed contacts 7250 and thence through the remainder of the circuit previously traced for operating the selected slide operating magnets 7120 and 7140. The operation of the clutch magnet 7180 initiates movement of the cams 7190 and 7260.

Referring back to the operation of the switch relay 5010, the closure of the contacts 5011 applies ground to the operating winding of the motor magnet 4950 so that this magnet is operated to condition the plurality of wipers associated with the stepping switch 5100 for movement into engagement with the contacts forming the second stepping position of this switch. The closure of the contacts 5012 completes the previously traced circuit for operating the clutch magnet 7180 and the selected permutation slide operating magnets in the internal printer control circuit 7100.

The movement of the clutch cam 7190 and the read cam 7260 initiated by the operation of the clutch magnet 7180 opens the contacts 7261 so that ground is removed from the operating winding of the switch relay 5010 thereby to release this relay to open the plurality of contacts controlled thereby. The opening of the contacts 5012 interrupts the circuits for energizing the permutation slide operating magnets 7120 and 7140 and the clutch magnet 7180. The release of the magnets 7120 and 7140 does not affect the permutation slides controlled thereby inasmuch as these slides are mechanically returned to their normal position in response to the rotation of the drive roll. The release of the clutch magnet 7180 does not affect the one-revolution clutch controlled thereby inasmuch as this clutch remains engaged until it is mechanically disengaged following the completion of a single revolution.

The opening of the contacts 5011 removes ground from the operating winding of the motor magnet 4950 so that the wipers associated with the stepping switch 5100 are moved into engagement with the contacts forming the second stepping position. However, the decoding relay circuit 7000 is not selectively operated in response to the movement of the wipers into engagement with the contacts forming the second stepping position inasmuch as this circuit is disconnected from the stepping switch 5100 by the opening of the remainder of the contacts controlled by the switch relay 5010. The opening of the remainder of the contacts controlled by the switch relay 5010 also releases the previously operated relays in the decoding relay circuit 7000.

Thereafter, the continuing rotation of the drive roll rotates the clutch cam 7190 so that the contacts 7250 are opened. The opening of the contacts 7250 produces no useful function at this time inasmuch as the prior opening of the contacts 7261 to release the switch relay 5010 interrupts all of the previously completed circuits for energizing the internal printer control circuit 7100.

After approximately one quarter of a revolution, the read cam 7260 recloses the contacts 7261 sequentially to operate the switch relay 5010 and the motor magnet 4950. As described above, the operation of the switch relay 5010 interconnects the wipers of the stepping switch 5100 with the operating windings of the decoding relays in the circuit 7000 so that these relays are selectively operated in accordance with the contacts selectively grounded in the second stepping position of the switch 5100. The operation of the motor magnet 4950 conditions the wipers in the stepping switch 5100 for movement into engagement with the contacts forming the third stepping position of this switch.

In the second stepping position (Fig. 15), the contacts in the second and ninth contact banks are grounded to represent the first alphabetical character designating the calling exchange. The ground applied to the wiper 5810 in the second contact bank is applied through the closed contacts 6815 to operate the decoding relay 6710 thereby to close the contacts 6711 and 6712. The ground applied to the wiper 6630 is transmitted to the operating winding of the decoding relay 6930 through the closed contacts 7035 to operate this relay. The operation of the decoding relay 6930 closes the contacts 6931, 6932 and 6933.

The closure of the contacts 6712 prepares an operating circuit for the permutation slide operating magnet 7120. The closure of the contacts 6932 prepares an operating path for the permutation slide operating magnet 7170. The closure of the contacts 6933 prepares an operating path for the permutation slide operating magnet 7150. The closure of either of the contacts 6711 or 6931 prepares a path for applying ground to the previously prepared paths extending to the slide magnets and also for applying ground to the operating winding of the clutch magnet 7180. Accordingly, the interconnection of the stepping switch 5100 with the decoding relay circuit 7000 prepares the decoding relay circuit 7000 for controlling the operation of the internal printer control circuit 7100 to produce a character representing the first letter designating the called exchange. At the same time as the decoding relay circuit 7000 is being thus prepared, the closure of the contacts 5011 operates the motor magnets 4950 to prepare the wipers associated with the stepping switch 5100 for movement into engagement with the contacts forming the third stepping position.

During the remaining three quarters of a cycle of revolution of the control cams 7190 and 7260, the printer executes a carriage return operation to return the carriage of the printer to a left marginal position and thereafter to provide three line feed operations. Accordingly, during the first cycle of revolution the information transmitted through the first stepping position of the switch 5100 is being utilized by the printer and the decoding relay circuit 7000 is conditioned for operation under the control of the item of information transmitted through the contacts forming the second stepping position. The movement of the carriage of the printer, in response to the receipt of the carriage return code, closes the contacts 7220 so that the slow-to-release line feed relay 7200 is operated to open the contacts 7201. Opening the contacts 7201 disables the internal printer control circuit 7100 inasmuch as it interrupts the only path for applying ground from the decoding relay circuit 7000 through the internal printer control circuit 7100 and therefrom, through the prepared paths provided by the selective operation of the relays in the decoding relay circuit 7000. This interruption of ground not only prevents reoperating a new permutation of permutation magnets but also prevents the reenergization of the one-revolution clutch magnet 7180, thereby insuring that the printer cannot be activated until such time that the line feed relay 7200 is released. Following a suitable time delay sufficient for the printer to complete three line feed operations, the slow-to-release relay 7200 releases to reclose the contacts 7201 and thereby to condition the printer for an additional cycle of operation.

It is desirable to interpose the carriage return operation of the printer preceding the production of any characters representing the items of information pertaining to the toll calls inasmuch as this operation returns the carriage of the printer to a proper starting position and also inserts three line feed operations to provide a proper spacing at the top of a toll ticket.

Assuming that the line feeding operations incident to the carriage return operation in the printer are completed prior to the time at which the clutch cam 7190 recloses the contacts 2750, this closure of the contacts 7250 applies ground to the previously conditioned circuits extending to the windings of the permutation slide magnets 7120, 7150 and 7170 to operate these magnets, and to release the permutation slides controlled thereby. The closure of the contacts 7250 also reenergizes the clutch magnet 7180 so that the drive roll is coupled to the motor for another cycle of rotation. Since neither the clutch magnet 7180 nor the conditioned permutation slide magnets can be operated until such time as the clutch cam 7190 has almost completed its cycle of rotation, a long time delay is introduced which insures the proper operation of the decoding relays in response to the information received from the stepping switch 5100. Also, since the ground applied to these conditioned permutation magnets must extend through a pair of contacts controlled by one of the decoding relays, it is impossible to actuate the internal printer control circuit 7100 prior to the time at which the decoding relay circuit 7000 has completed the translation of the information provided by the stepping switch 5100 into a form suitable for use by the printer.

As shown in Fig. 14 of the drawings, the release of the permutation slides controlled by the magnets 7120, 7150 and 7170 conditions a type bar carrying the alphabetical character "K" for actuation. This character is assumed to be the first letter in the alphabetical designation of exchange 7 in which the calling subscriber is located. This information, which represents the exchange of the calling subscriber, is provided by wiring the contacts forming the second and third stepping position of the switch 5100 to ground since the playback control circuit 30 and the printer are associated with only the calling exchange 7, which is assumed to be identified as "KI."

The continuing rotation of the drive roll moves the read cam 7260 beyond its normal position so that the contacts 7261 are reopened to release the switch relay 5010 and the motor magnet 4950. The release of the switch relay 5010 interrupts the energizing circuit for the decoding relays 6710 and 6930 so that these relays release and thereby deenergize the magnets 7120, 7150 and 7170. However, the permutation slides controlled by these magnets are not returned to normal inasmuch as they are returned mechanically by the operation of the drive roll during a subsequent portion of this second cycle of rotation. It is desirable to utilize contacts interposed between the decoding relays and the wipers of the stepping switch 5100 inasmuch as the circuit extending from the wipers to the decoding relays is initially interrupted at these contacts, and therefore prevents excessive arcing at the contact points of the stepping switch 5100 when the wipers are stepped into engagement with the contacts in the next stepping position.

The release of the motor magnet 4950 advances the plurality of wipers controlled thereby into engagement with the contacts forming the third stepping position. However, the movement of the wipers into engagement with the contacts in the third stepping position does not operate the decoding relay circuit 7000 at this time inasmuch as the interconnection between the stepping switch 5100 and this circuit is interrupted by the release of the switch relay 5010. Immediately following the opening of the contacts 7261, the clutch cam 7190 is rotated far enough beyond its normal position to open the clutch contacts 7250 thereby disconnecting the permutation slide magnets and the clutch magnet 7180 from the decoding relay circuit 7000.

Figure 4:
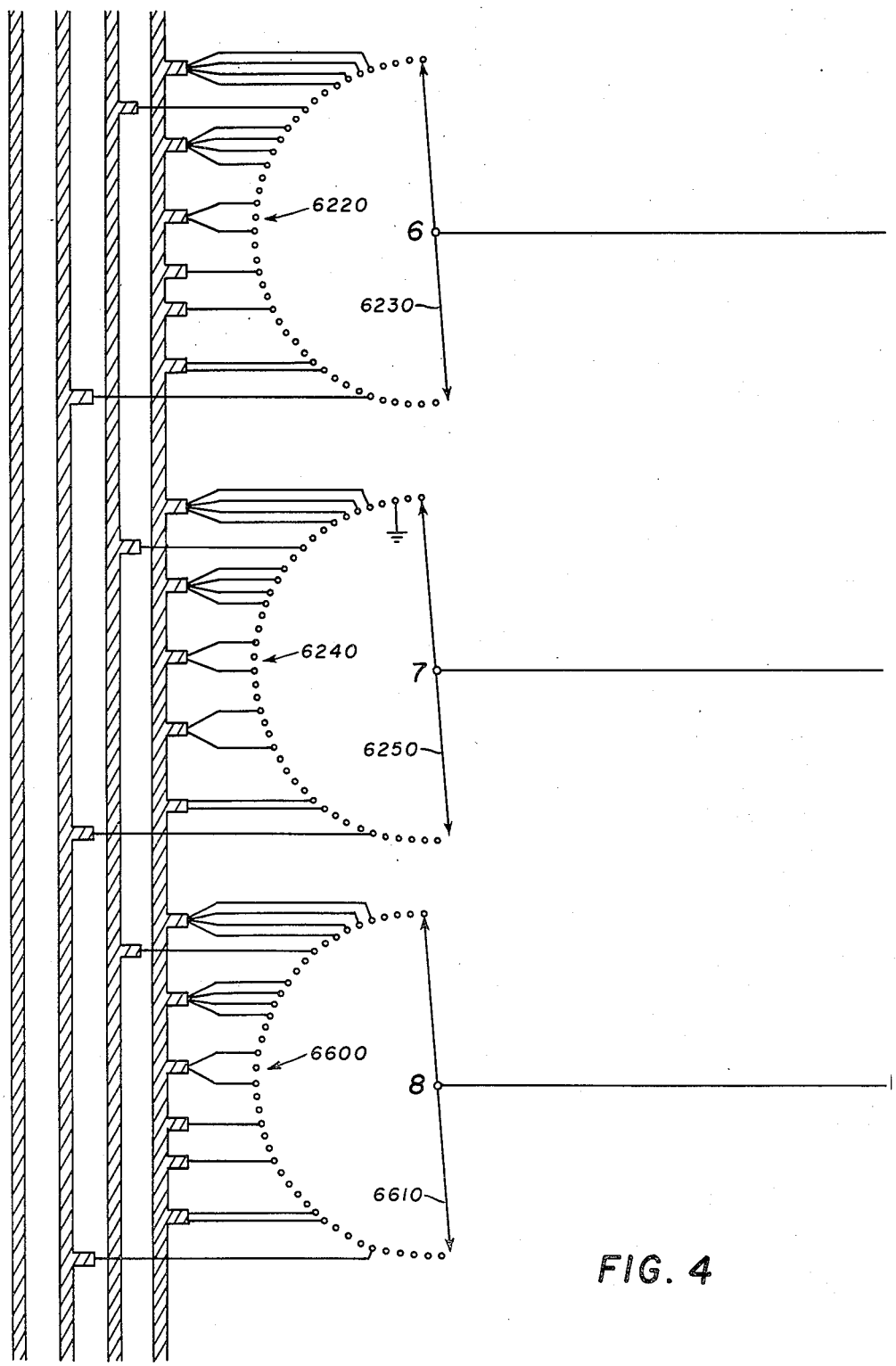
Figure 5:
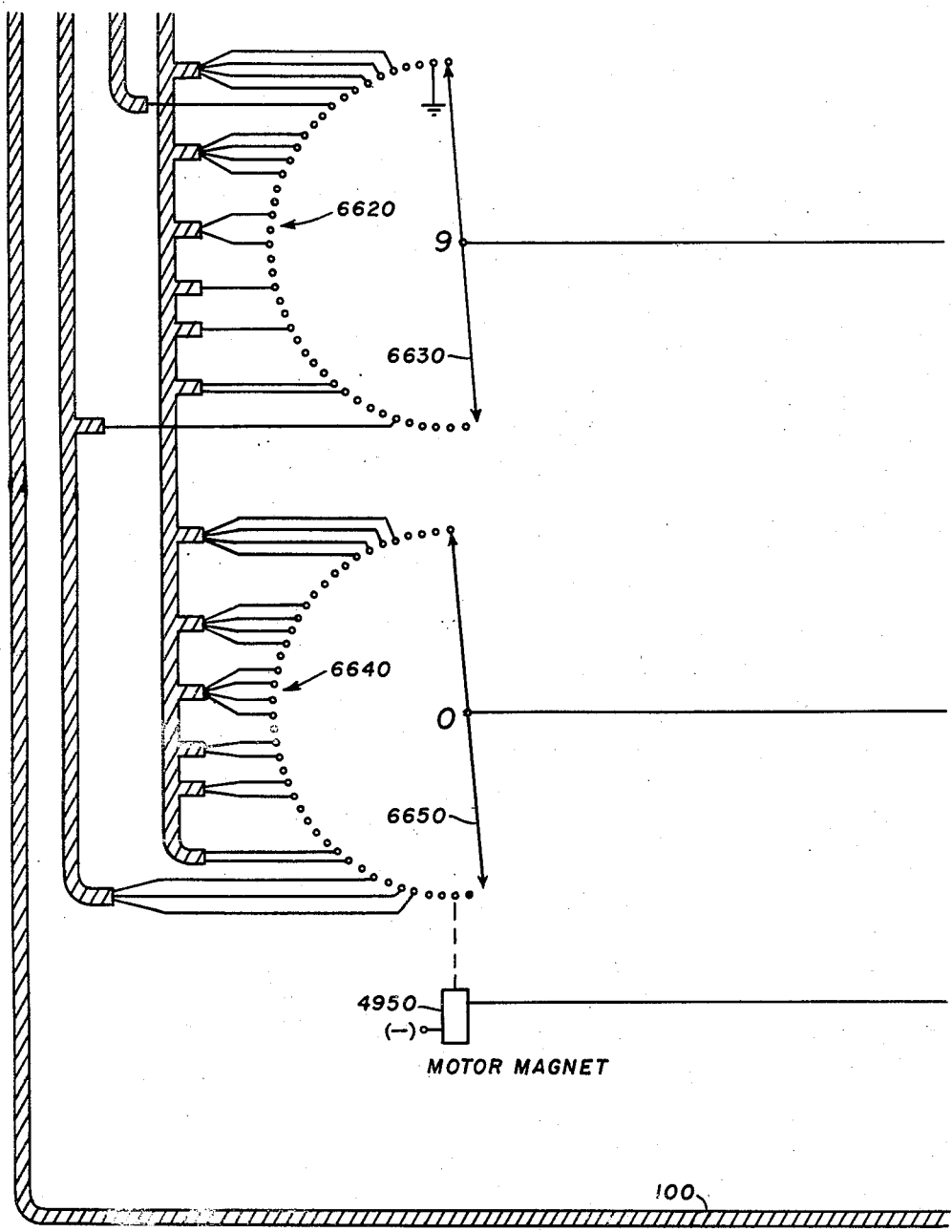
Figure 6:
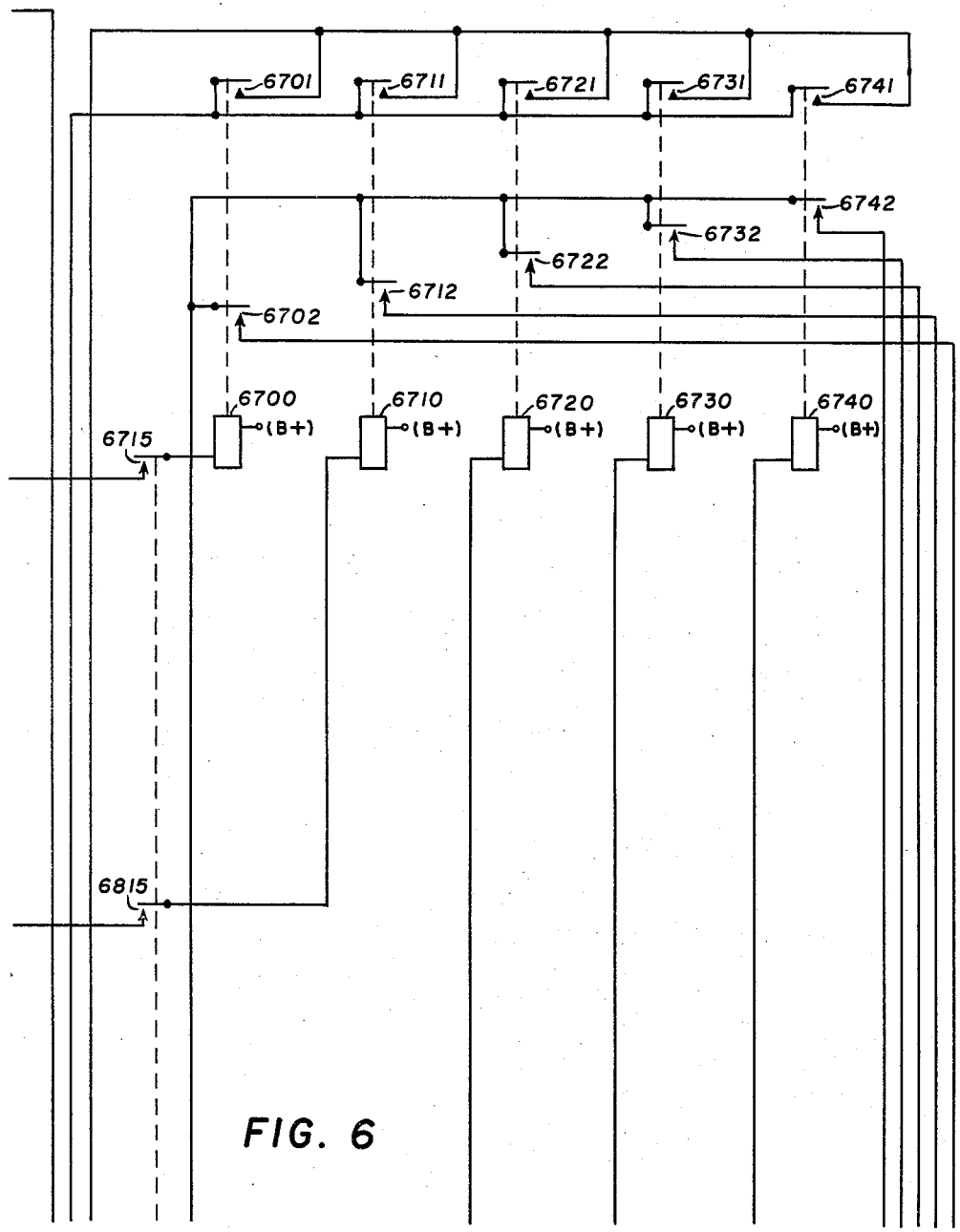
Figure 7:
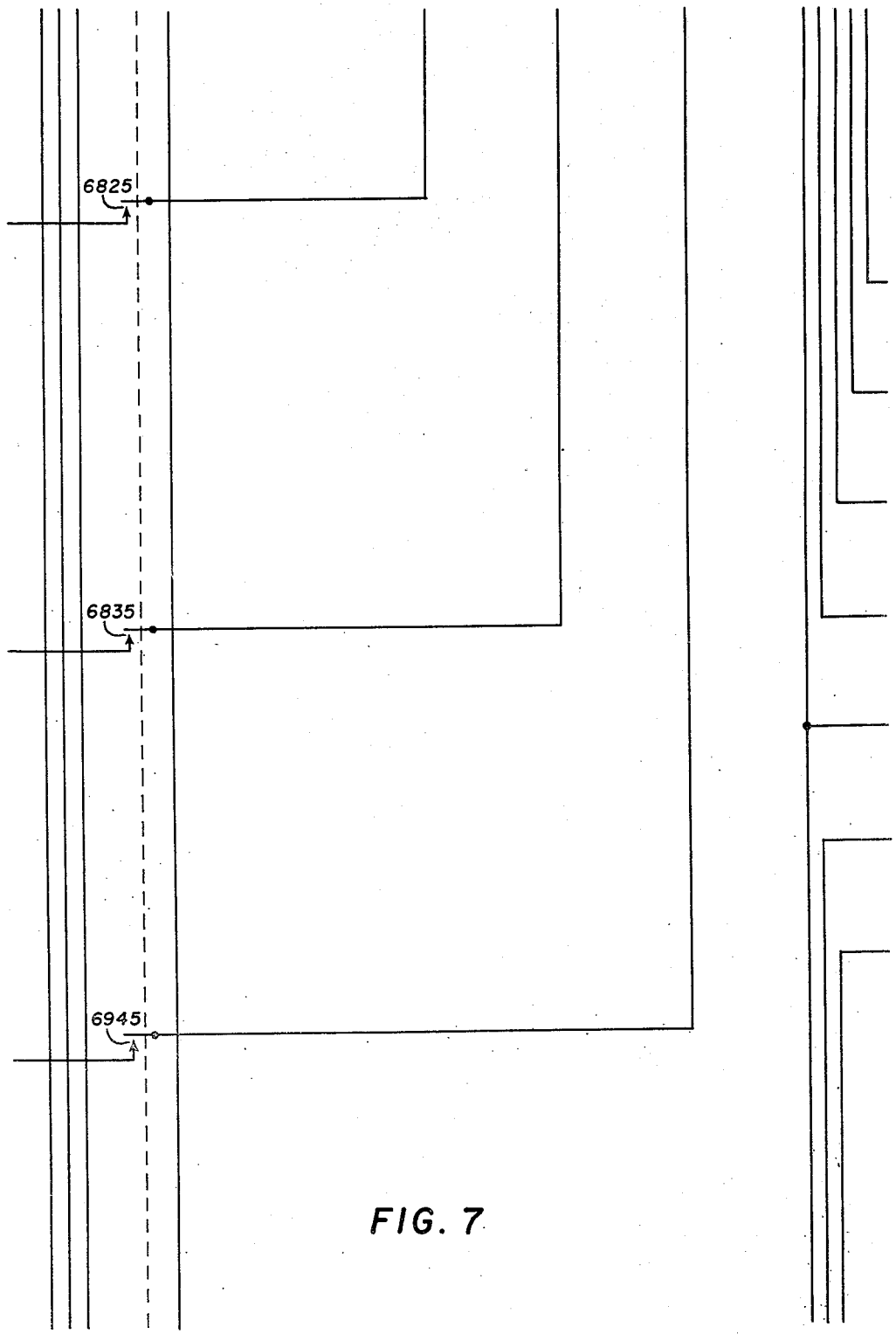
Figure 8:
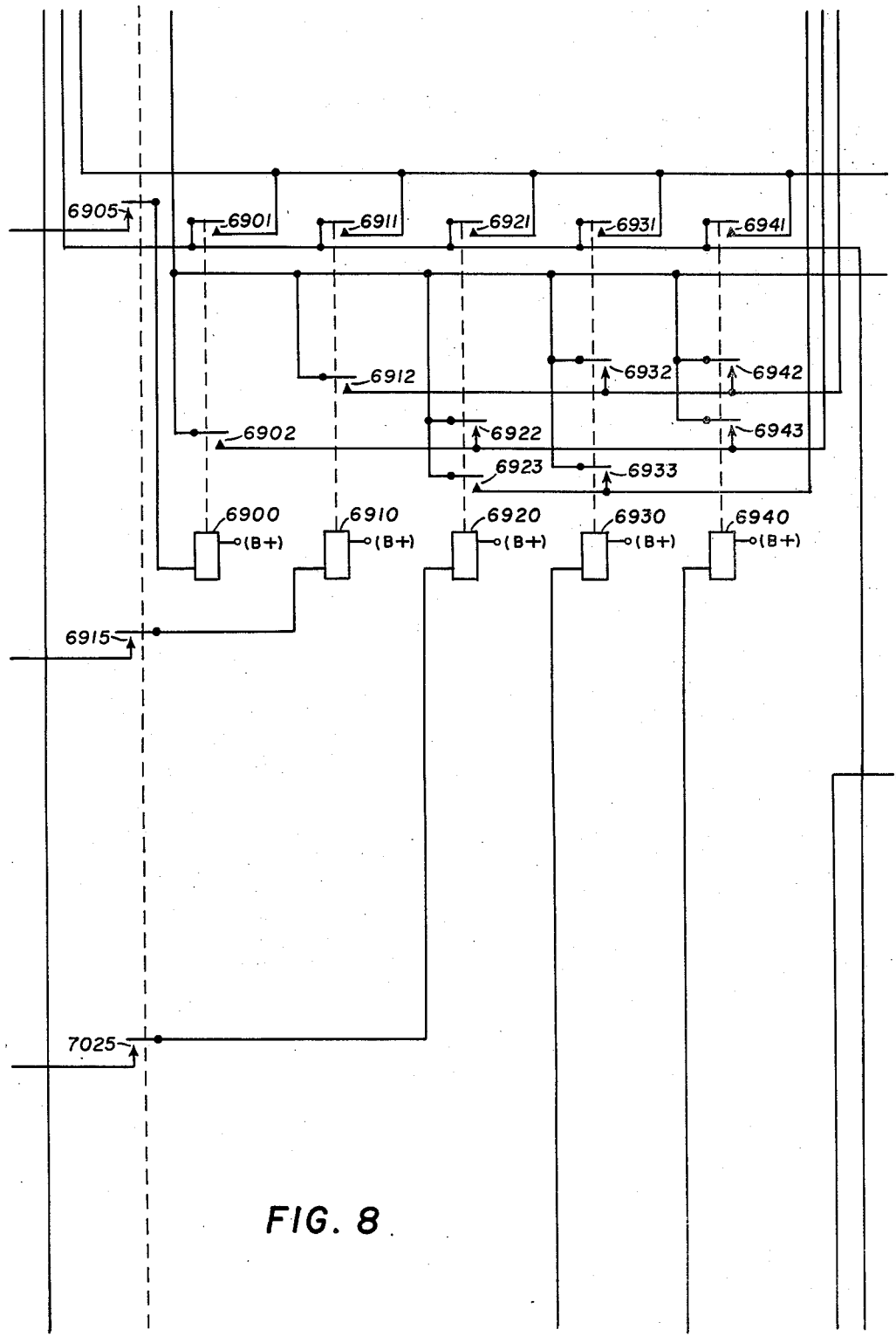
Figure 9:
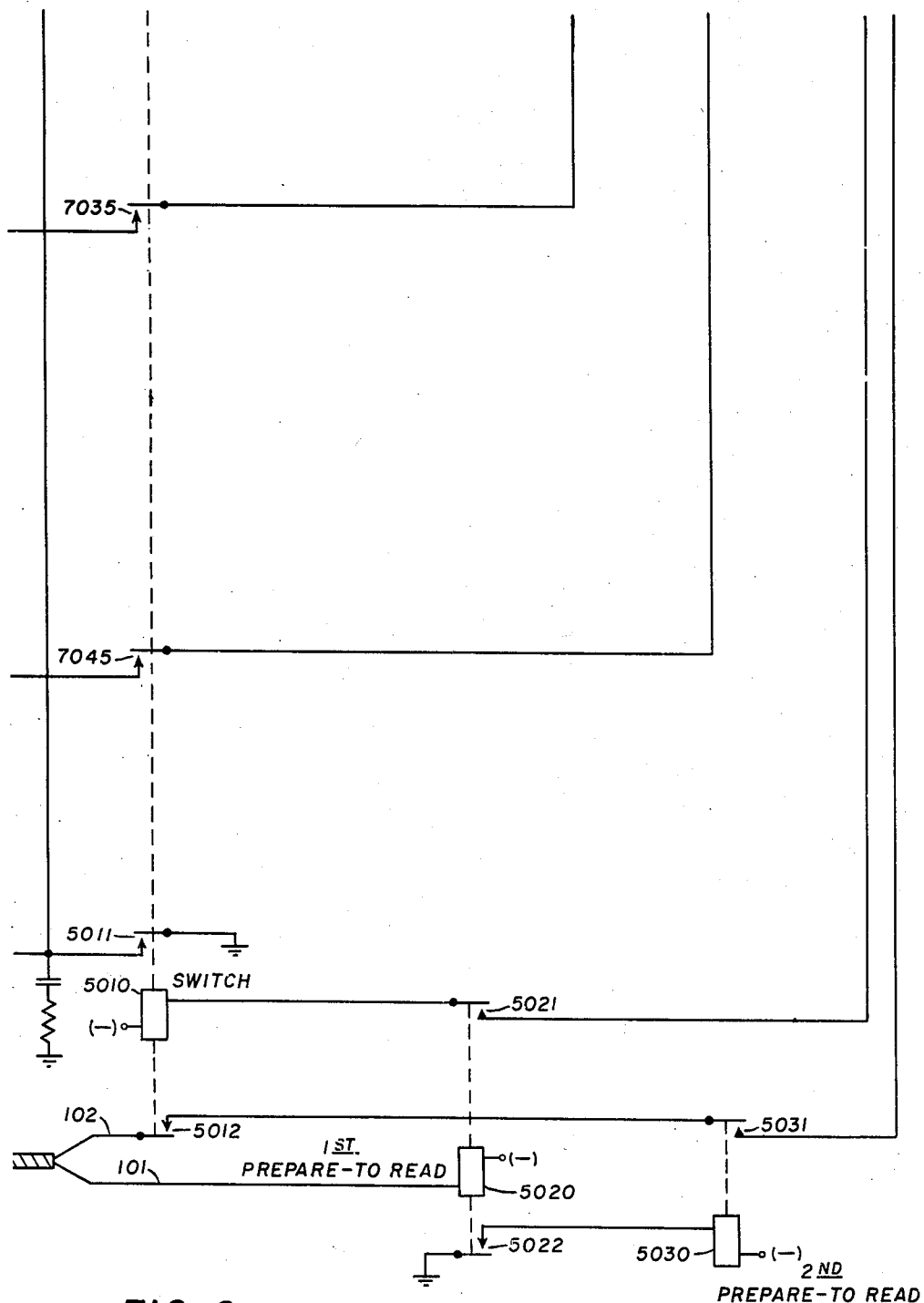

During the continuing rotation of the drive roll, the selected type bar bearing the alphabetical character "K" is struck against a tape paper to produce a visible indication thereof. Also, this continuing rotation recloses the contacts 7261 to reoperate the switch relay 5010 and thereafter, the motor magnet 4950. The closure of the contacts controlled by the switch relay 5010 reconnects the stepping switch 5100 with the decoding relay circuit 7000. As shown in Figs. 2 and 4 of the drawings, the contacts in the second and seventh contact banks in the third stepping position of the switch 5100 are directly wired to ground so as to ground the wipers 5810 and 6250. The ground applied to these wipers operates the decoding relays 6710 and 6910 to close the contacts 6711, 6712, and 6911, 6912, respectively.

The closure of either of the contacts 6711 and 6911, together with the closure of the contacts 5012, applies ground to the open clutch contacts 7250. The closures of the contacts 6712 and 6912 conditions the operating windings of the permutation magnets 7120 and 7170, respectively, for operation by connecting them to the other side of the clutch contacts 7250. The continuing rotation of the drive roll moves the cams 7190 and 7260 to a point approaching their normal position, whereupon, the contacts 7250 are closed to simultaneously operate the clutch magnet 7180 and the conditioned permutation magnets 7120 and 7170, thus releasing the permutation slides controlled thereby.

As shown in Fig. 14 of the drawings, the release of the permutation slides controlled by the magnets 7120 and 7170 selects a type bar bearing the alphabetical character "I." The letter "I" is the second letter of the alphabetical notation designating the exchange 7 in which the toll call originated.

The movement of the read cam 7260 beyond its normal position, reopens the contacts 7261 so that the switch relay 5010 and the motor magnet 4950 are released, thereby opening the connection between the decoding relay circuit 7000 and the stepping switch 5100, and releasing the stepping switch 5100 to move the wipers controlled thereby into engagement with contacts forming the fourth stepping position. The disconnection of the decoding relay circuit 7000 from the stepping switch 5100 releases the relays 6710 and 6910 previously operated under the control of the contacts grounded to represent the alphabetical character "I." Thereafter, the clutch contacts 7250 are released to condition the internal printer control circuit 7100 for operation under the control of the decoding relay circuit 7000 in response to the item of information transmitted in the fourth stepping position of the switch 5100. During the continuing rotation of the drive roll, the selected type bar carrying the character "I" is moved into engagement with the paper tape to produce a visible indication thereof adjacent the previously printed character "K."

After approximately 90 degrees of rotation, the read cam 7260 recloses the contacts 7261 to reoperate the switch relay 5010 and the motor magnet 4950. The switch relay, in closing, interconnects the decoding relay circuit 7000 with the stepping switch 5100, and the operation of the motor magnet 4950 conditions the wipers controlled thereby for movement into engagement with the contacts forming the fifth stepping position.

As shown in Fig. 15 of the drawings, the contacts in the second and fourth contact banks in the fourth stepping position are wired directly to ground so as to operate the decoding relays 6710 and 6730 to initiate a cycle of operation similar to that described hereinabove when the contacts 7250 are closed. This carriage return code operates the internal printer control circuit 7100 to return the carriage of the printer to its left marginal position, and, thereafter, to produce three separate line feed operations. The carriage return of the printer also operates the line feed relay 7200 to open the contacts 7201, thereby to insure that the line feeding operations are completed before ground is reapplied to the open contacts controlled by the clutch cam 7190. The completion of the carriage return operation by the carriage of the printer completes the production of the first printed line, on the ticket which contains the adjacent alphabetical characters "KI" representing the designation of the exchange in which the toll call was originated.

During the carriage return movement and following the movement of the read cam 7260 past its normal position, ground is removed from the operating winding of the switch relay 5010 so that this relay and the motor magnet 4950 are released, thereby advancing the wipers controlled by the motor magnet into engagement with the contacts forming the fifth stepping position. After approximately one quarter of the revolution during which the carriage return takes place, ground is reapplied to the operating winding of the switch relay 5010 to operate this relay to interconnect the wipers with the circuit 7000. At this time, each of the wipers 5450, 5810, 5830, 5850, 6210, 6230, 6250, 6610, 6630 and 6650 is in engagement with a contact connected directly to the output anode of one of the counting tubes in the first counting chain of storage chains 38 wherein is electronically manifested the magnitude of the digit comprising the first digit in the directory number of the calling subscriber.

Assuming that the call being described is the one shown in Fig. 13, the "3" manifesting tube in the first counting chain is conductive so that ground is applied to the contact in the third contact deck of the fifth stepping position of the switch 5100 to operate the decoding relay 6720. The operation of this relay closes the contacts 6721 and 6722. Inasmuch as only a single tube in the first counting chain is rendered conductive under the control of the first group of mark pulses, only a single decoding relay in the circuit 7000 is operated.

The closure of the contacts 6721 applies ground to the new open clutch contacts 7250, and the closure of contacts 6722 conditions the operating circuit for the permutation magnet 7130. Following almost a complete cycle of rotation of the drive roll, the clutch cam 7190 is moved to close the contacts 7250 thereby simultaneously energizing the clutch magnet 7180 and the conditioned permutation magnet 7130, to release the permutation slide controlled by this magnet.

As shown in Fig. 14 of the drawings, the operation of the decoding relay 6720 and, consequently, of the permutation magnet 7130 selects a type bar bearing the numerical character "3" so that this type bar is conditioned for movement into engagement with the roll of paper tape in the printer. The continuing rotation of the drive roll and the cams 7190 and 7260 carried thereon moves the read cam 7260 so that the contacts 7261 are opened, thereby releasing the switch relay 5010 to interrupt the operating circuit for the relay 6720 and to release the motor magnet 4950 so that the wipers controlled thereby are moved into engagement with the contacts forming the sixth stepping position. Thereafter, this rotation moves the clutch cam 7190 so that the contacts 7250 are opened to condition the internal printer control circuit 7100 for operation under the control of the decoding circuit 7000 in response to information pertaining to the second digit of the calling subscriber's number.

Thereafter, the next three cycles of rotation of the drive roll carrying the clutch cam 7190 and the read cam 7260 advance the wipers of the stepping switch 5100 into engagement with the contacts forming the seventh, eighth and ninth stepping positions of this switch. During these three rotations of the drive roll, the decoding circuit 7000 is sequentially energized under the control of the second, third and fourth counting chains to cause the selective and sequential operation of the internal printer control circuit 7100 to produce numerical characters representing the second, third and fourth digits of the directory number of the calling subscriber. As shown in Fig. 13 of the drawings, it is assumed that the numerical characters "4," "5" and "6" are printed in response to the information transmitted to the decoding circuit 7000 from the contacts forming the sixth, seventh and eighth stepping positions (Fig. 15) of the switch 5100.

Following the printing of the numerical characters "4," "5" and "6" and with the wipers of the stepping switch 5100 positioned in engagement with the contacts forming the ninth stepping position, the operation of the switch relay 5010 under the control of the read cam 7260 selectively operates the decoding relays 6710 and 6730 in accordance with the prewired and grounded contacts in the second and fourth contact decks 5800 and 5840.

As described above in detail, the operation of the decoding relays 6710 and 6730 operates the permutation magnets 7120 and 7140 to initiate the carriage return operation in the printer. During this carriage return operation, the carriage is returned to the left marginal position and the line feed relay 7200 is energized to introduce a suitable time delay for permitting the carriage to complete three line feed operations thereby to space the completed second line of printing from the third line which is to be produced as described hereinafter. Accordingly, the carriage return code transmitted to the printer, following the printing of the digit "6" representing the fourth digit of the calling subscriber's directory number terminates the printing of the second line on the toll ticket and returns the carriage of the printer to its left marginal position in condition for receiving items of information to be printed in the third line.

Upon completion of the carriage return operation, the successive opening and closing of the contacts 7261 advances the wipers of the stepping switch 5100 into engagement with the contacts forming the tenth stepping position, and thereafter operates the switch relay 5010 to interconnect these wipers with the decoding relay circuit 7000. Assuming that the destination relay in the destination relay circuit 2150 which is operated represents a called office designated by the alphabetical characters "PI," the operation thereof closes a plurality of contacts to ground conductors connected respectively to the tenth contact in the third contact bank and to the tenth contact in the eighth contact deck so that the wipers 5830 and 6610, respectively, are grounded.

The grounding of the wiper 5830 operates the decoding relay 6720 to close the contacts 6721 and 6722. The application of ground to the wiper 6610 operates the decoding relay 6920 to close the contacts 6921, 6922 and 6923. The closure of either of the contacts 6921 or 6721 applies ground to the open contacts 7250 controlled by the clutch cam 7190. The closure of the contacts 6722, 6922 and 6923 conditions the operating circuits for the permutation slide magnets 7130, 7150 and 7160 so that, when the clutch cam 7190 recloses the contacts 7250 controlled thereby, the clutch magnet 7180 and the conditioned permutation magnets are operated to release the permutation slides controlled thereby. These released permutation slides represent the letter "P" which is the first character of the alphabetical designation of the exchange to which the call was extended.

The operation of the clutch magnet 7180 initiates another cycle of rotation of the drive roll during which the selected type bar carrying the character "P" is moved into engagement with the paper tape, the wipers of the switch 5100 are moved into engagement with the contacts forming the eleventh stepping position, and the switch relay 5010 is reclosed to operate the decoding relay circuit 7000 under the control of the item of information transferred through the contacts forming the eleventh stepping position of the switch 5100. The operation of the destination relay in addition to grounding the conductors representing the letter "P" also grounds the conductors connected respectively to the eleventh contact in the second contact bank 5800 and connected to the eleventh contact in the seventh contact bank 6240 so that the wipers 5810 and 6250 are grounded to operate the decoding relays 6710 and 6910.

As disclosed in Fig. 14 of the drawings, the simultaneous operation of the relays 6710 and 6910 releases the permutation slides controlled by the permutation magnets 7120 and 7170 to select a type bar carrying the character "I." During the next cycle of rotation of the clutch and read cams 7190 and 7260, this selected type bar is moved into engagement with the paper tape to print the character "I" adjacent the previous printed character "P." Also during this cycle, the switch relay 5010 is operated and the wipers of the stepping switch 5100 are moved into engagement with the contacts forming the twelfth stepping position wherein the contacts in the first and fourth contact banks are wired to ground so that the wipers 5450 and 5850 are grounded. The application of ground to these two wipers operates the decoding relays 6700 and 6730 thereby resulting in the conditioning of the circuits for the permutation magnets 7110 and 7140 (Fig. 14). When, at the end of this cycle of rotation, the clutch cam closes the contacts 7250, these two conditioned permutation magnets are operated to release their permutation slides and thereby to select a type bar bearing the character representing a dash (−).

Concurrently with the selection of this type bar, the one-way clutch magnet 7180 is reenergized to initiate another cycle of rotation of the drive roll during which the dash (−) is printed on the paper tape immediately following the previously printed character "I." During this next cycle of rotation, the stepping switch 5100 is first released to advance its wipers into engagement with the contacts forming the thirteenth stepping position of the switch 5100 and thereafter is operated to condition these wipers for movement into engagement with the contacts forming the fourteenth stepping position. The operation of the switch relay 5010 to reoperate the motor magnet 4950 closes the plurality of contacts controlled thereby so that the wipers of the stepping switch 5100 which are in engagement with the contacts forming the thirteenth stepping position are interconnected with the operating windings of the relays forming the decoding relay circuit 7000.

As shown in Fig. 15 of the drawings, the contacts forming the thirteenth stepping position are interconnected with the anodes of the tubes forming the fifth counting chain of storage chains 38 wherein is registered the first digit of the called subscriber's directory number. As shown in Fig. 13, the "6" manifesting tube in the fifth counting chain is rendered conductive under the control of the fifth group of mark pulses. Accordingly, the decoding relay 6900 is operated through a circuit extending from closed contacts similar to the contacts 5032 through the "6" manifesting tube in the fifth chain, the output conductor associated therewith, the wiper 6230, the closed contacts 6905 and thence through the operating winding of the decoding relay 6900 to grounded battery. The operation of the decoding relay 6900 closes the contacts 6901 and 6902. The closure of the contacts 6901 prepares a circuit for operating the permutation slide operating magnet 7160. The closure of the contacts 6901 prepares a path for applying ground to the previously prepared circuit for operating the magnet 7160. When the cams 7190 and 7260 are returned to approximately their normal position, the contacts 7250 are closed to complete the circuits for energizing the operating windings of the magnet 7160 and the clutch magnet 7180. The operation of the clutch magnet 7180 conditions the drive roll for another cycle of rotation.

The operation of the magnet 7160 releases the permutation slide controlled thereby so that, during the cycle of operation initiated by the operation of the clutch magnet 7180, a type bar bearing the numerical character "6" is selected and moved into engagement with the paper tape to produce the numerical character "6" immediately following the "−" previously printed under the control of the information transmitted through the contacts forming the twelfth stepping position of the switch 5100.

During the cycle of rotation of the drive roll during which the numerical character "6" is printed, the cam 7260 is moved beyond its normal position so that the contacts 7261 are opened to release the switch relay 5010 and the motor magnet 4950. The release of the switch relay 5010 disconnects the stepping switch 5100 from the decoding relay circuit 7000. The release of the motor magnet 4950 moves the wipers controlled thereby into engagement with the contacts forming the fourteenth stepping position. As shown in Fig. 15 of the drawings, the contacts forming the fourteenth stepping position of the switch 5100 are interconnected with the output anodes of the tubes forming the sixth counting chain of storage chains 38 wherein is registered the second digit of the directory number of the called subscriber. The "7" manifesting tube in the sixth counting chain is now conducting, as shown in Fig. 13, so that following approximately one-quarter of a revolution of the cam 7260, the contacts 7261 are reclosed to operate the switch relay 5010 and the motor magnet 4950.

The operation of the motor magnet 4950 conditions the wipers controlled thereby for movement into engagement with the contacts forming the fifteenth stepping position. The operation of the switch relay 5010 interconnects the stepping switch 5100 with the decoding relay circuit 7000 so that the decoding relay 6910 is operated in response to the grounding of the wiper 6250 by the "7" manifesting tube in the sixth counting chain.

The operation of the decoding relay 6910 closes the contacts 6911 and 6912. The closure of the contacts 6912 prepares a path for operating the permutation slide operating magnets 7170 and the closure of the contacts 6911 prepares a circuit for applying ground to the previously prepared path extending to the magnet 7170. When the control cams 7190 and 7260 approach their normal position, the contacts 7250 are closed to simultaneously operate the clutch magnet 7180 and the conditioned magnet 7170. The operation of the magnet 7180 reengages the one-revolution clutch so that another cycle of rotation of the drive roll is initiated.

The operation of the magnet 7170 releases the permutation slide controlled thereby so that a type bar bearing the numerical character "7" is selected and conditioned for movement into engagement with the paper tape during the newly initiated cycle of rotation of the drive roll. This numerical character is printed immediately following the numerical character "6" previously printed under the control of the information transmitted to the contacts forming the thirteenth stepping position. As the read cam 7260 moves beyond its normal position, the contacts 7261 are open to sequentially release the switch relay 5010 and the motor magnet 4950. The release of the switch relay 5010 disconnects the decoding relay circuit 7000 from the stepping switch 5100 and the release of the motor magnet 4950 moves the wipers of the stepping switch 5100 into engagement with the contacts forming the fifteenth stepping position.

Following approximately one-quarter of a revolution of the cam 7260, the contacts 7261 are reclosed to sequentially operate the switch relay 5010 and the motor magnet 4950. The operation of the motor magnet 4950 conditions the wipers controlled thereby for movement into engagement with the contacts forming the sixteenth stepping position. The operation of the switch relay 5010 interconnects the decoding relay circuit 7000 with the stepping switch 5100. In the fifteenth stepping position of the switch 5100, the contacts thereof are connected to the output anodes of the tubes forming the seventh counting chain wherein is registered the third digit of the directory number of the called subscriber. As shown in Fig. 13, the "8" manifesting tube in this chain is rendered conductive under the control of the seventh group of mark pulses. The conductive "8" manifesting tube in the seventh counting chair applies ground to the wiper 6610. The application of ground to the wipers 6610 operates the decoding relay 6920 to close the contacts 6921, 6922 and 6923. The closure of the contacts 6922 and 6923 prepares operating circuits for the permutation slide operating magnets 7150 and 7160, respectively. The closure of the contacts 6921 prepares a circuit for applying ground to the previously conditioned circuits extending to the internal printer control circuit 7100.

As the control cams approach their normal positions, the contacts 7250 are reclosed to operate the conditioned magnets 7150 and 7160 and to operate the one-revolution clutch magnet 7180. The operation of the magnet 7180 reengages the drive motor with the drive roll so that another cycle of operation is initiated. The operation of the magnets 7150 and 7160 releases a pair of permutation slides to select a type bar bearing the numerical character "8".

During the next succeeding cycle of rotation of the drive roll, the selected type bar is moved into engagement with the paper tape to print the character "8" immediately following the previously printed character "7" representing the second digit of the directory number of the called subscriber. During this next succeeding cycle, as the read cam 7260 moves beyond its normal position, the contacts 7261 are opened to release the switch relay 5010 and to release the motor magnet 4950. The release of the switch relay 5010 disconnects the stepping switch 5100 from the decoding relay circuit 7000 so that the clutch magnet 7180 and the operated magnets 7150 and 7160 are released. The release of the motor magnet 4950 moves the wipers controlled thereby into engagement with the contacts forming the sixteenth stepping position. In the sixteenth stepping position, the contacts are connected to the output anodes of the plurality of tubes forming the eighth counting chain.

As shown in Fig. 13, the eighth counting chain is operated under the control of the eighth group of mark pulses and the "9" manifesting tube is operated in this chain. Accordingly, following approximately one-quarter of a cycle of revolution, the read cam 7260 recloses the contacts 7261 to sequentially operate the switch relay 5010 and the motor magnet 4950. The operation of the motor magnet 4950 conditions the wipers controlled thereby for movement into engagement with the contacts forming the seventeenth stepping position. The operation of the switch relay 5010 interconnects the wipers of the stepping switch 5100 with the decoding relay circuit 7000. Since the "9" manifesting tube in the eighth counting chain is conducting, the wiper 6630 is grounded therethrough to operate the decoding relay 6930.

The operation of the decoding relay 6930 closes the contacts 6931, 6932 and 6933. The closure of the contacts 6932 and 6933 prepares operating paths for the permutation slide operating magnets 7150 and 7170. The closure of the contacts 6931 prepares a circuit for applying ground to the previously prepared circuits extending to the magnets in the printer control circuit 7100. Accordingly, when the cams 7190 and 7260 return to approximately their normal position, the magnets 7180, 7150 and 7170 are operated. The operation of the magnet 7180 initiates another cycle of rotation of the drive roll carrying the cams 7190 and 7260.

The operation of the magnets 7150 and 7170 releases the permutation slides controlled thereby so that a type bar bearing the numerical character "9" is selected. During the newly initiated cycle of rotation of the drive roll, this selected type bar is moved into engagement with the paper tape to produce the printed character "9" immediately following the previously printed character "8" and, thus prints the last or fourth digit of the directory number of the called subscriber. The printing of the last digit of the directory number of the called subscriber terminates the printing of the third line on the toll ticket. The third line of printing on the toll ticket identifies both the exchange and the number of the called subscriber and includes two alphabetical characters representing the exchange in which the called subscriber is located, which characters are separated from the four numerical characters representing the directory number of the called subscriber by a "–".

The movement of the read cam 7260 beyond its normal position at the early portion of the cycle of rotation thereof during which the numerical character "9" is printed opens the contacts 7261 so that the switch relay 5010 and the motor magnet 4950 are sequentially released. The release of the switch relay 5010 disconnects the decoding relay circuit 7000 from the stepping switch 5100 so that the magnets 7150, 7170 and 7180 are released. The release of the motor magnet 4950 advances the plurality of wipers controlled thereby into engagement with the contacts forming the seventeenth stepping position of the switch 5100.

In the seventeenth stepping position the contacts in the second and fourth contact banks are wired directly to ground so that the wipers 5810 and 5850 are grounded. The selective grounding of these two wipers operates the decoding relays 6710 and 6730 to close the contacts 6711, 6712 and 6731, 6732, respectively. The closure of the contacts 6712 and 6732 prepares circuits for operating the permutation slide operating magnets 7120 and 7140, respectively. The closure of either of the contacts 6711 or 6731 prepares a circuit for applying ground to the previously prepared circuit extending to the selected permutation slide operating magnets in the internal printer control circuits 7100. Thereafter, as the control cams 7190 and 7260 are moved into approximately their normal position, the contacts 7250 are closed to operate the clutch magnet 7180 and the conditioned permutation slide operating magnets 7120 and 7140. The operation of the magnet 7180 re-establishes the connection between the drive roll and the motor so that the control cams 7190 and 7260 are rotated through an additional cycle of rotation.

The operation of the magnets 7120 and 7140 releases the permutation slides controlled thereby to initiate a carriage return operation. During this carriage return operation, the movable carriage of the printer is returned to its left marginal position and thereafter actuates a means for advancing the paper tape through three line feed operations. The carriage return operation immediately following the printing of the numerical character "9" terminates the production of the third line of printing on the toll ticket and introduces a space between the printed third line and the fourth line of printing which is to be produced under the control of the contacts forming the eighteenth, nineteenth, twentieth and twenty-first stepping positions of the switch 5100.

Incident to the carriage return operation of the printer, the contacts 7220 are closed to operate the line feed relay 7200 whereby the contacts 7201 are opened. The opening of the contacts 7201 insures that the line feed operations are completed before the clutch magnet 7180 may be re-energized to print the numerical character represented by the selective grounding of the contacts forming the eighteenth stepping position.

As the read cam 7260 moves beyond its normal position during the cycle of rotation in which the carriage return operation is executed, the contacts 7261 are opened to sequentially release the switch relay 5010 and the motor magnet 4950. The release of the switch relay 5010 disconnects the stepping switch 5100 from the decoding relay circuit 7000 and thereby releases the magnets 7120, 7140 and 7180. The release of the motor magnet 4950 advances the wipers controlled thereby into engagement with the contacts forming the eighteenth stepping position. In the eighteenth position, the contacts are connected to the output anodes of the tubes forming the eleventh counting chain of storage chains 38.

Following approximately one-quarter of the revolution, the read cam 7260 recloses the contacts 7261 so that the switch relay 5010 and the motor magnet 4950 are sequentially operated. The operation of the motor magnet 4950 conditions the wipers controlled thereby for movement into engagement with the contacts forming the nineteenth stepping position. The operation of the switch relay 5010 interconnects the stepping switch 5100 with the decoding relay circuit 7000 so that the decoding relay 6940 is operated by the ground applied through the conductive "0" manifesting tube in the eleventh counting chain. The operation of the decoding relay 6940 closes the contacts 6941, 6942 and 6943. The closure of the contacts 6942 and 6943 prepares paths for operating the magnets 7170 and 7160, respectively. The closure of the contacts 6941 prepares a path for applying ground to the previously conditioned circuits extending to the internal printer control circuit 7100.

As the clutch cam 7190 is moved into approximately its normal position, the contacts 7250 are reclosed to operate the clutch magnet 7180 and the conditioned magnets 7160 and 7170. The operation of the clutch magnet 7180 reestablishes a driving connection between the motor and the drive roll so that an additional cycle of rotation of the control cams 7190 and 7260 is initiated.

The operation of the magnets 7160 and 7170 selects a type bar bearing the character "0" or cipher so that this type bar is moved into engagement with the paper tape during the cycle of rotation initiated by the operation of the clutch magnet 7180. The printing of the "0" initiates the printing of the fourth line on the toll ticket and represents the magnitude of the tens hours digit designating the time of day on which the toll call was terminated.

As the read cam 7260 is moved beyond its normal position, the contacts 7261 are opened to sequentially release the switch relay 5010 and the motor magnet 4950. The release of the switch relay 5010 disconnects the decoding relay circuit 7000 from the stepping switch 5100 and accordingly releases the magnets 7160, 7170 and 7180. The release of the motor magnet 4950 moves the wipers of the stepping switch 5100 into engagement with the contacts forming the nineteenth stepping position.

The contacts forming the nineteenth stepping position of the stepping switch 5100 are connected to the output anodes of the plurality of tubes forming the twelfth counting chain of storage chains 38. As shown in Fig. 13, the "2" manifesting tube in the twelfth counting chain is rendered conductive under the control of the eleventh group of mark pulses.

Accordingly, when, following one-quarter of a cycle of revolution, the read cam 7260 recloses the contacts 7261 to sequentially operate the switch relay 5010 and the motor magnet 4950, the decoding relay 6710 is operated by the ground applied to the wiper 5810 in the second contact bank 5800. The operation of the decoding relay 6710 closes the contacts 6711 and 6712. The closure of the contacts 6712 prepares an operating path for the permutation slide operating magnet 7120 in the internal printer control circuit 7100. The closure of the contacts 6711 prepares a path for applying ground to the previously prepared path extending to the operating magnet 7120. The operation of the motor magnet 4950 concurrent with the operation of the decoding relay 6710 conditions the wipers of the stepping switch 5100 for movement into engagement with the contacts forming the twentieth stepping position.

At the end of this cycle of rotation of the control cams 7190 and 7260, the contacts 7250 are closed to operate the clutch magnet 7180 and the selected permutation slide operating magnet 7120. The operation of the clutch magnet 7180 initiates an additional cycle of rotation of the drive roll carrying the cams 7190 and 7260. The operation of the magnet 7120 releases the permutation slide controlled thereby so that a type bar bearing the numerical character "2" is conditioned for operation under the control of the drive roll during the next succeeding cycle of rotation.

This selected type bar is moved into engagement with the paper tape to print the numerical character "2" immediately following the previously printed character "0" and thereby terminates the production of the numerical notation representing the hour at which the toll call was terminated.

As the read cam 7260 next moves beyond its normal position, the contacts 7261 are opened to sequentially release the switch relay 5010 and the motor magnet 4950.

The release of the switch relay 5010 disconnects the stepping switch 5100 from the decoding relay circuit 7000 and accordingly, releases the operated magnets 7180 and 7120. The release of the motor magnet 4950 moves the wipers controlled thereby into engagement with the contacts forming the twentieth stepping position. In this stepping position, the contacts of the switch 5100 are interconnected with the output anodes of the tubes forming the thirteenth counting chain. As described hereinabove, the "1" manifesting tube in this chain is rendered conductive.

When the read cam 7260 next closes the contacts 7261 to sequentially operate the switch relay 5010 and the motor magnet 4950, the decoding relay 6700 in the decoding relay circuit 7000 is operated by the ground applied through the wiper 5450 from the conductive "1" manifesting tube in the thirteenth counting chain. The operation of the decoding relay 6700 closes the contacts 6701 and 6702. The closure of the contacts 6702 prepares an operating path for the permutation slide operating magnet 7110. The closure of the contacts 6701 prepares a circuit for applying ground to the previously conditioned circuit extending to the operating winding of the magnet 7110. The operation of the motor magnet 4950 conditions the wipers of the stepping switch 5100 for movement into engagement with the contacts forming the twenty-first stepping position thereof.

During the continuing rotation of the drive roll, the clutch cam 7190 is returned to approximately its normal position to close the contacts 7250. The closure of the contacts 7250 operates the clutch magnet 7180 and the conditioned magnet 7110. The operation of the clutch magnet 7180 reengages the one-revolution clutch so that the control cams 7190 and 7260 are moved through an additional cycle of rotation. The operation of the magnet 7110 releases the permutation slide controlled thereby so that a type bar bearing the numerical character "1" is selected for actuation by the drive roll during the next succeeding cycle of rotation thereof.

During this next cycle of rotation, the drive roll moves the selected type bar into engagement with the paper tape so as to print the character "1" immediately following the character "2" previously printed under the control of the information transmitted through the contacts forming the nineteenth stepping position of the switch 5100. The digit "1" represents the magnitude of the tens minutes digit representing the time at which the toll call was terminated.

As the read cam 7260 moves beyond its normal position during this next succeeding cycle of rotation, the contacts 7261 are opened to sequentially release the switch relay 5010 and the motor magnet 4950. The release of the switch relay 5010 disconnects the decoding relay circuit 7000 from the stepping switch 5100 and, accordingly, releases the operated magnets 7110 and 7180. The release of the motor magnet 4950 moves the wipers controlled thereby into engagement with the contacts forming the twenty-first stepping position. In this stepping position, the contacts are connected to the output anodes of the tubes forming the fourteenth counting chain of storage chains 38. As shown in Fig. 13, the fourteenth counting chain is operated under the control of the thirteenth group of mark pulses to render the "7" manifesting tube conductive.

Following approximately one-quarter of a revolution, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-second stepping position of the switch 5100. The operation of the switch relay 5010 interconnects the wipers of the stepping switch 5100 with the operating windings of the decording relay circuit 7000. Since the "7" manifesting tube in the fourteenth counting chain is conducting, ground is applied to the wiper 6250 to operate the decoding relay 6910. The operation of the decoding relay 6910 closes the contacts 6911 and 6912. The closure of the contacts 6912 conditions the path for operating the permutation slide operating magnet 7170. The closure of the contacts 6911 prepares a circuit for applying ground to the previously conditioned circuit extending to the operating winding of the magnet 7170.

As the clutch cam 7190 approaches its normal position, the contacts 7250 are closed to operate the magnets 7170 and 7180. The operation of the magnet 7180 reengages the one-revolution clutch so that the drive roll is rotated through an additional cycle of rotation. The operation of the permutation slide operating magnet 7170 releases the permutation slide controlled thereby so that a type bar bearing the numerical character "7" is selected for operation during the next succeeding cycle of rotation of the drive roll.

During this next cycle of rotation, the drive roll moves the selected type bar into engagement with the paper tape to print the numerical character "7" immediately following the previously printed character "1." The printing of the character "7" completes the production of the fourth line of printing on the toll ticket and also completes the printed representation of the time of day at which the toll call was terminated. Thus, the numerical characters "0," "2," "1," "7" are printed to form the fourth line of printing on the toll ticket and thereby to indicate that the toll call extended between the previously identified subscribers was terminated at 2:17 a.m.

As the read cam 7260 moves beyond its normal position at the beginning of the cycle of rotation during which the numerical character "7" is printed on the toll ticket, the contacts 7261 are opened to sequentially release the switch relay 5010 and the motor magnet 4950. The release of the switch relay 5010 disconnects the stepping switch 5100 from the decoding relay circuit 7000 and thereby releases the operated magnets 7170 and 7180. The release of the motor magnet 4950 advances the wipers controlled thereby into engagement with the contacts forming the twenty-second stepping position. As shown in Fig. 15 of the drawings, the twenty-second contacts in the second and fourth contact banks are wired directly to ground. Therefore, ground is applied to the wipers 5810 and 5850.

Following approximately one-quarter of a cycle of revolution, the read cam 7260 recloses the contacts 7261 so that the switch relay 5010 and the motor magnet 4950 are operated. The operation of the motor magnet 4950 conditions the wipers of the stepping switch 5100 for movement into engagement with the contacts forming the twenty-third stepping position of the switch 5100. The operation of the switch relay 5010 interconnects the wipers of the stepping switch 5100 with the decoding relay circuit 7000 so that the ground applied to the wipers 5810 and 5850 produces the simultaneous operation of the decoding relays 6710 and 6730. The operation of these relays closes the contacts 6711, 6712, 6731 and 6732. The closure of the contacts 6712 and 6732 prepares the operating paths for the permutation slide operating magnets 7120 and 7140, respectively, in the internal printer control circuit 7100. The closure of either of the contacts 6711 or 6731 prepares a path for extending ground to the previously prepared circuits for the selected magnets in the internal printer control circuit 7100.

As the clutch cam 7190 is rotated into approximately its normal position, the contacts 7250 are reclosed to operate the conditioned magnets 7120 and 7140 and the clutch magnet 7180. The operation of the clutch magnet 7180 reengages the one-revolution clutch so that the drive roll carrying the control cams 7190 and 7260 is rotated through an additional cycle of rotation. The operation of the magnets 7120 and 7140, as described hereinabove, initiates a carriage return operation during which the movable carriage of the printer is returned to its left marginal position and also during which three line feed operations are performed by the printer in order to adequately space the previously produced fourth line of printing from the fifth line of printing which is to be produced under the control of the next items of information transmitted to the printer.

As the read cam 7260 moves beyond its normal position during the cycle of rotation in which the carriage return operation takes place, the contacts 7261 are opened to sequentially release the switch relay 5010 and the motor magnet 4950. The release of the switch relay 5010 disconnects the decoding relay circuit 7000 from the stepping switch 5100 so that the operated magnets 7120, 7140 and 7180 are released. The release of the motor magnet 4950 moves the wipers controlled thereby into engagement with the contacts forming the twenty-third stepping position. As shown in Fig. 16 of the drawings, the contacts forming the twenty-third stepping postion are connected to the output anodes of the tubes forming the fifteenth counting chain. As shown in Fig. 13 and described hereinabove, the fifteenth and sixteenth counting chains are operated under the control of the fourteenth group of mark pulses to render the "6" manifesting tube in the units months ring-connected fifteenth counting chain conductive. Since the fourteenth group only includes six mark pulses, the sixteenth counting chain, manifesting tens months, is not energized. Accordingly, the "0" manifesting tube remains conductive. The ground provided by the conductive tube is applied to the twenty-third contact in the contact bank 6640 in the stepping switch 5100.

After the read cam 7260 has rotated through approximately 90°, the contacts 7261 are reclosed to sequentially operate the switch relay 5010 and the motor magnet 4950. The operation of the motor magnet 4950 conditions the wipers controlled thereby for movement into engagement with the contacts forming the twenty-fourth stepping position of the switch 5100. The operation of the switch relay 5010 interconnects the decoding relay circuit 7000 with the stepping switch 5100 so that the ground applied to the twenty-third contact in the "0" contact bank 6640 is applied to the wiper 6650. This ground is applied through the closed contacts 7045 to operate the decoding relay 6940. The operation of the decoding relay 6940 closes the contacts 6941, 6942 and 6943. The closure of the contacts 6942 prepares a circuit for operating the magnet 7170, and the closure of the contacts 6943 prepares a circuit for operating the magnet 7160. The closure of the contacts 6941 prepares a circuit for transmitting ground to the previously prepared circuits of the magnets in the internal printer control circuit 7100.

As the clutch cam 7190 approaches its normal position, the contacts 7250 are closed to operate the conditioned magnets 7160 and 7170, and to operate the clutch magnet 7180. The operation of the clutch magnet 7180 reengages the one-revolution clutch so that an additional cycle of rotation of the drive roll is initiated. The operation of the magnets 7160 and 7170 releases the permutation slides controlled thereby so as to select a type bar bearing the numerical character "0."

During this next succeeding cycle of operation, the selected type bar is moved into engagement with the paper tape under the control of the drive roll so as to print the character "0" as the first character in the fifth line of printing on the toll ticket. During this cycle of rotation in which the character "0" is printed, the movement of the read cam 7260 beyond its normal position opens the contacts 7261 so that the switch relay 5010 and the motor magnet 4950 are sequentially released. The release of the switch relay 5010 disconnects the stepping switch 5100 from the decoding relay circuit 7000 so that the operated magnets 7160, 7170 and 7180 are released. The release of the motor magnet 4950 moves the wipers controlled thereby into engagement with the contacts forming the twenty-fourth stepping position.

As shown in Fig. 16 of the drawings, the contacts forming the twenty-fourth stepping position of the switch 5100 are interconnected with the output anodes of the plurality of tubes forming the ring-connected fifteenth counting chain manifesting units months. As described hereinabove, the "6" manifesting tube in the fifteenth counting chain is rendered conductive under the control of the fourteenth group of mark pulses.

Following approximately 90° of rotation, the read cam 7260 recloses the contacts 7261 so that the switch relay 5010 and the motor magnet 4950 are sequentially operated. The operation of the motor magnet 4950 conditions the wipers controlled thereby for movement into engagement with the contacts forming the twenty-fifth stepping position of the switch 5100. The operation of the switch relay 5010 interconnects the wipers of the stepping switch 5100 with the decoding relay circuit 7000 so that ground is applied from the twenty-fourth contact in the contact bank 6220 to the wiper 6230. The ground applied to the wiper 6230 operates the decoding relay 6900 to close the contacts 6901 and 6902. The closure of the contacts 6902 prepares a circuit for operating the permutation slide operating magnet 7160 and the closure of the contacts 6901 prepares a circuit for applying ground to the previously conditioned circuit extending to the selected magnet in the internal printer control circuit 7100.

As the clutch cam 7190 is moved into approximately its normal position at the termination of the cycle of rotation during which the character "0" is printed on the toll ticket, the contacts 7250 are closed to operate the conditioned magnet 7160 and to operate the clutch magnet 7180. The operation of the clutch magnet 7180 as described hereinabove initiates an additional cycle of rotation of the drive roll carrying the control cams 7190 and 7260. The operation of the magnet 7160 releases the permutation slide controlled thereby so that a type bar bearing the numerical character "6" is selected for actuation by the drive roll.

During this next succeeding cycle of rotation, the drive roll moves the selected type bar into engagement with the paper tape to print the character "6" immediately following the previously printed character "0." Also, during the original portion of this next cycle of rotation, the read cam 7260 is moved beyond its normal position to open the contacts 7261, thereby sequentially releasing the switch relay 5010 and the motor magnet 4950. The release of the switch relay 5010 disconnects the decoding relay circuit 7000 from the switch 5100 so that the operated magnets 7160 and 7180 are released. The release of the motor magnet 4950 moves the wipers controlled thereby into engagement with the contacts forming the twenty-fifth stepping position. As disclosed in Fig. 16 of the drawings, the twenty-fifth contacts in the first and fourth contact decks 5440 and 5840, respectively, are connected to ground.

After the read cam 7260 has rotated through approximately 90°, the contacts 7261 are reclosed to sequentially operate the switch relay 5010 and the motor magnet 4950. The operation of the motor magnet 4950 conditions the wipers of the stepping switch 5100 for movement into engagement with the contacts forming the twenty-sixth stepping position of the switch 5100. The operation of the switch relay 5010 interconnects the wipers of stepping switch 5100 with the operating windings of the relays in the decoding relay circuit 7000. The ground applied to the twenty-fifth contacts in the first and fourth contact banks is applied to the wipers 5450 and 5850 so as to operate the decoding relays 6700 and 6730, respectively. The operation of these relays closes the contacts 6701, 6702, 6731 and 6732. The closure of the contacts 6702 and 6732 prepares the operating circuits for the magnets 7110 and 7140, respectively. The closure of either of the contacts 6701 and 6731 prepares a circuit for applying ground to the previously prepared circuits extending to the selected magnets in the internal printer control circuit 7100.

When the clutch cam 7190 returns to approximately its normal position, the contacts 7250 are closed to operate the conditioned magnets 7110 and 7140, and to operate the clutch magnet 7180. The operation of the clutch magnet 7180 reengages the one-revolution clutch so that the drive roll and the cams 7190 and 7260 carried thereon are rotated through an additional cycle of rotation. The operation of the magnets 7110 and 7140 releases the permutation slides controlled thereby so that the type bar bearing the "–" character is selected for operation during the next cycle of rotation of the drive roll.

During this next succeeding cycle of rotation, the drive roll moves the selected type bar into engagement with the paper tape to produce a "–" immediately following the previously printed character "6" and thereby to separate the following information relating to the day on which the toll call was terminated from the printed information relating to the month during which the toll call was terminated. As the read cam 7260 moves beyond its normal position in the cycle of rotation during which the "–" is printed, the contacts 7261 are opened to sequentially release the switch relay 5010 and the motor magnet 4950. The release of the switch relay 5010 disconnects the decoding relay circuit 7000 from the stepping switch 5100 and, accordingly, releases the operated magnets 7110, 7140 and 7180. The release of the motor magnet 4950 moves the wipers controlled thereby into engagement with the contacts forming the twenty-sixth stepping position.

In the twenty-sixth stepping position, the contacts are connected to the output anodes of the tubes forming the seventeenth counting chain of storage chains 38 manifesting tens days. A described hereinabove and shown in Fig. 13, the seventeenth counting chain is sequentially operated under the control of the fifteenth group of mark pulses to render the "2" manifesting tube conductive.

Thereafter, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-seventh stepping position of the switch 5100. The operation of the switch relay 5010 interconnects the wipers of stepping switch 5100 with the operating windings of the relays forming the decoding relay circuit 7000 and, accordingly, the ground applied to the twenty-fifth contact in the contact deck 5800 is transmitted through the wiper 5810 and the closed contacts 6815 to operate the decoding relay 6710. The operation of the decoding relay 6710 closes the contacts 6711 and 6712. The closure of the contacts 6712 prepares a circuit for operating the permutation slide operating magnet 7120 and the closure of the contacts 6711 prepares a circuit for applying ground through the previously conditioned circuit extending to the selected magnet in the internal printer control circuit 7100. Thereafter, the clutch cam 7190 moves to approximately its normal position and, in doing so, closes the contacts 7250. The closure of the contacts 7250 operates the selected magnet 7120 and the clutch magnet 7180. The operation of the magnet 7180 reengages the drive roll with the motor in the printer for another cycle of rotation. The operation of the magnet 7120 releases the permutation slide controlled thereby to select a type bar bearing the numerical character "2".

During the next succeeding cycle of rotation of the drive roll, the selected type bar is moved into engagement with the paper tape to print the numerical character "2" immediately following the "–" separating this information from the numerical designation of the month. As the read cam 7260 moves beyond its normal position during the cycle of rotation in which the numerical character "2" is printed, the contacts 7261 are opened to sequentially release the switch relay 5010 and the motor magnet 4950. The release of the switch relay 5010 disconnects the decoding relay circuit 7000 from the wipers of the stepping switch 5100 so that the operated magnets 7120 and 7180 are released. The release of the motor magnet 4950 moves the wipers controlled thereby into engagement with the contacts forming the twenty-seventh stepping position of the switch 5100. As shown in Fig. 16 of the drawings, the contacts forming the twenty-seventh stepping position of the switch 5100 are directly connected to the output anodes of the plurality of counting tubes forming the eighteenth counting chain of storage chains 38 manifesting units days. As described hereinabove and shown in Fig. 13, the eighteenth counting chain is operated under the control of the sixteenth group of mark pulses to selectively render the "1" manifesting tube in the seventeenth chain conductive.

Following approximately 90° of rotation, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-eighth stepping position of the switch 5100. The operation of the relay 5010 interconnects the wipers of stepping switch 5100 with the operating windings of the relays in the decoding circuit 7000 so that the ground applied to the twenty-seventh contact in the first contact bank 5440 is applied through the wiper 5450 and the contacts 6715 to operate the decoding relay 6700. The operation of the decoding relay 6700 closes the contacts 6702 to prepare an operating path extending to the permutation slide operating magnet 7110, and closes the contacts 6701 to prepare a circuit for applying ground to the previously prepared circuit extending to the selected operating magnet in the internal printer control circuit 7100.

As the clutch magnet 7190 approaches its normal position, the contacts 7250 are closed to operate the clutch magnet 7180 and the selected magnet 7110. The operation of the magnet 7180 conditions the printer for another cycle of operation. The operation of the magnet 7110 releases the permutation slide controlled thereby so as to select a type bar bearing the numerical character "1".

During this next succeeding cycle of rotation, the drive roll moves the selected type bar into engagement with the paper tape to print the numerical character "1" immediately following the "2" previously printed. The printing of the character "1" completes the printing of the two digits representing the tens and units digits of the day on which the toll call was terminated.

As the read cam 7260 is moved beyond its normal position during the cycle of rotation in which the character "1" is printed, the contacts 7261 are opened to sequentially release the switch relay 5010 and the motor magnet 4950. The release of the switch relay 5010 disconnects the decoding relay circuit 7000 from ground so that the relays therein are released to release the operated magnets 7110 and 7180. The release of the motor magnet 4950 moves the wipers of the switch 5100 into engagement with the contacts forming the twenty-eighth stepping position. As shown in Fig. 16 of the drawings, the twenty-eighth contacts in the first and fourth contact banks 5440 and 5840 are prewired to ground, thus representing a "–" as shown in Fig. 14 of the drawings.

Following approximately 90° of rotation, the read cam 7260 recloses the contacts 7261 to sequentially operate the switch relay 5010 and the motor magnet 4950. The operation of the motor magnet 4950 conditions the wipers controlled thereby for movement into engagement with the contacts forming the twenty-ninth stepping position of the switch 5100. The operation of the switch relay 5010 closes the contacts controlled thereby, including the contacts 6715 and 6835, so that ground is applied through the wipers 5450 and 5850 to operate the decoding relays 6700 and 6730. As described hereinabove, the selective operation of the relays 6700 and 6730 conditions the operating paths for the magnets in the internal printer control circuit 7100 which select the type bar bearing the character "–". As the clutch cam 7190 moves into approximately its normal position, the contacts 7250 are closed to operate the selected magnets in the internal printer control circuit 7100 and the clutch magnet 7180 thereby initiating another cycle of operation.

The type bar selected by the operation of the magnets in the control circuit 7100 bears the character "–". During this next cycle of rotation of the drive roll, the selected type bar is moved into engagement with the paper tape immediately following the previously printed numerical character "1" to print a "–" for separating the designation of the day on which the toll call was terminated from the printed information relating to the year in which the toll call was terminated, which information is assumed to be "51" and next to be printed under the control of the contacts forming the twenty-ninth and thirtieth stepping position of the switch 5100.

As the read cam 7260 moves beyond its normal position, the contacts 7261 are opened to sequentially release the switch relay 5010 and the motor magnet 4950. The release of the switch relay 5010 disconnects the decoding relay circuit 7000 from its source of ground so that the previously operated magnets in the printer control circuit 7100 are released. The release of the motor magnet 4950 advances the wipers controlled thereby into engagement with the contacts forming the twenty-ninth stepping position. As shown in Fig. 16 of the drawings, the only contact grounded in the twenty-ninth stepping position is the contact in the fifth contact bank 6200.

Following approximately 90° of rotation, the read cam 7260 closes the contacts 7261 so that the switch relay 5010 and the motor magnet 4950 are sequentially operated. The operation of the motor magnet 4950 conditions the wipers controlled thereby for movement into engagement with the contacts forming the thirtieth stepping position in the switch 5100. The operation of the switch relay 5010 interconnects the wipers of the stepping switch 5100 with the decoding relay circuit 7000 so that ground is applied from the grounded contact in the fifth contact bank 6200 through the wiper 6210 and the closed contacts 6945 to operate the decoding relay 6740. The operation of the decoding relay 6740 closes the contacts 6741 and 6742 thereby to prepare the internal printer control circuit 7100 for the selection of a type bar bearing the numerical character "5". Accordingly, when the clutch cam 7190 is moved into approximately its normal position to close the contacts 7250, the magnets 7180 and 7150 are operated. The operation of the magnet 7180 re-initiates another cycle of rotation of the drive roll. The operation of the magnet 7150 selects a type bar bearing the numerical character "5".

During this additional cycle of rotation of the drive roll, the selected type bar is moved into engagement with the paper tape at a position immediately following the previously printed "–" so as to print the numerical character "5" to indicate the first digit of the year in which the call was terminated. Thereafter, the opening of the contacts 7261 sequentially releases the switch relay 5010 and the motor magnet 4950. The release of the switch relay 5010 disconnects ground from the decoding relay circuit 7000 so that the operated magnets 7180 and 7150 are released. The release of the motor magnet 4950 advances the wipers controlled thereby into engagement with the contacts forming the thirtieth stepping position. As shown in Fig. 16 of the drawings, the thirtieth contact in the first contact bank 5440 is connected directly to ground to represent the units digit of the year in which the toll call was terminated.

Following approximately 90° of rotation, the contacts 7261 are reclosed to sequentially operate the switch relay 5010 and the motor magnet 4950. The operation of the motor magnet 4950 conditions the wipers controlled thereby for movement into engagement with the contacts forming the thirty-first stepping position. The operation of the switch relay 5010 interconnects the stepping switch 5100 with the decoding relay circuit 7000 so that ground is applied through the wiper 5440 and the closed contacts 6715 to operate the decoding relay 6700. The operation of this relay closes the pair of contacts controlled thereby to condition the internal printer control circuit 7100 for selecting a type bar bearing the numerical character "1", as shown in Fig. 14 of the drawings.

As the clutch cam 7190 moves into approximately its normal position, the contacts 7250 are closed to operate the magnets 7110 and 7180. The operation of the magnet 7180 initiates another cycle of operation of the printer. The operation of the magnet 7110 releases the permutation slide controlled thereby so that a type bar bearing the numerical character "1" is selected. During the next succeeding cycle of rotation of the drive roll, this type bar is moved into engagement with the paper tape to print the numerical character "1" immediately following the previously printed character "5". The printing of the numerical character "1" terminates the printing of the fifth line on the toll ticket 7900. This fifth line of printing represents the date on which the toll call was terminated and includes, when considered from left to right, the digits "06" representing the month of June, a "–", the digits "21" representing the 21st day of June, a "–", and the digits "51" which represent the year in which the toll call was terminated.

Obviously, since the information provided by the twenty-ninth and thirtieth stepping positions of the switch 5100, representing the year in which the toll call was completed, is provided by prewiring to ground a single contact in one of the contact banks, the designation of the year in which the toll call was terminated may be very easily changed by varying the wiring of the program switch 5100.

The next movement of the read cam 7260 beyond its normal position opens the contacts 7261 so that the switch relay 5010 and the motor magnet 4950 are released. The release of the switch relay 5010 disconnects the decoding relay circuit 5100 so that the operated relays therein and in the internal printer control circuit 7100 are released. The release of the motor magnet 4950 advances the wipers controlled thereby into engagement with the contacts forming the thirty-first stepping position. As shown in Figs. 2 and 3 of the drawings, the thirty-first contacts in the second and fourth contact banks 5800 and 5840 are connected directly to ground to provide a carriage return code.

Thereafter, the reclosure of the contacts 7261 under the control of the cam 7260 sequentially operates the switch relay 5010 and the motor magnet 4950. The operation of the motor magnet 4950 conditions the wipers controlled thereby for movement into engagement with the contacts forming the thirty-second stepping position of the switch 5100. The operation of the relay 5010 interconnects the stepping switch 5100 with the decoding relay circuit 7000 so that the decoding relays 6710 and 6730 are operated to condition the internal printer control circuit 7100 for starting a carriage return operation of the printer.

When the contacts 7250 are next closed, the internal printer control circuit 7100 initiates a carriage return operation of the printer wherein the carriage is returned to its left marginal position and three line feed operations are performed. The carriage return operation terminates the printing of the fifth line on the toll ticket and also provides a space between the printed fifth line and the sixth line which is to be printed under the control of the contacts forming the thirty-second and thirty-third stepping positions of the switch 5100.

As the read cam 7260 moves beyond its normal position, the contacts 7261 are opened to sequentially release the switch relay 5010 and the motor magnet 4950. The release of the switch relay 5010 disconnects the stepping switch 5100 from the decoding relay circuit 7000 so that the operated relays therein are released. The release of the motor magnet 4950 moves the wipers controlled thereby into engagement with the contacts forming the thirty-second stepping position. In the thirty-second stepping position, the contacts are connected to the output anodes of the plurality of tubes forming the tenth counting chain of the storage chains 38, manifesting tens minutes of elapsed time.

As described hereinabove and shown in Fig. 13, the "2" manifesting tube in the tenth counting chain is selectively rendered conductive under the control of the ninth group of mark pulses. Therefore, when the contacts 7261 are reclosed to initiate sequential operation of the switch relay 5010 and the motor magnet 4950, ground is applied through the wiper 5810 and the closed contacts 6815 to operate the decoding relay 6710 whereby the contacts 6711 and 6712 are closed. As disclosed in Fig. 14 of the drawings, the operation of the decoding relay 6710 prepares the internal printer control circuits 7100 for the selection of a type bar bearing the numerical character "2". The previous operation of the motor magnet 4950 conditions the wipers controlled thereby for being advanced into engagement with the contacts forming the thirty-third stepping position of the switch 5100.

When the clutch cam 7190 approaches its normal position, the contacts 7250 are closed to operate the clutch magnet 7180 and the permutation slide operating magnet 7120. The operation of the clutch magnet 7180 initiates another cycle of rotation of the drive roll carrying the cams 7190 and 7260. The operation of the magnet 7120 selects a type bar bearing the numerical character "2".

During this additional cycle of rotation, the drive roll moves the selected type bar into engagement with the paper tape to print the numerical character "2" as the first digit in the sixth line of printing. As the read cam 7260 moves beyond its normal position in the cycle of rotation during which the numerical character "2" is printed, the contacts 7261 are opened to sequentially release the switch relay 5010 and the motor magnet 4950. The release of the switch relay 5010 disconnects the stepping switch 5100 from the decoding relay circuit 7000 so that the operated relay 6710 and the magnets 7120 and 7180 are released. The release of the motor magnet 4950 moves the wipers controlled thereby into engagement with the contacts forming the thirty-third stepping position of the switch 5100. As shown in Fig. 16 of the drawings, the contacts forming the thirty-third stepping position are directly connected to like designated output anodes of the counting tubes forming the ring-connected ninth counting chain manifesting units minutes of elapsed time. As described hereinabove and shown in Fig. 13, the "6" manifesting tube in the ninth counting chain is rendered conductive by the ninth group of mark pulses transmitted thereto.

Accordingly, when the read cam 7260 is rotated through approximately 90° to reclose the contacts 7261, the switch relay 5010 and the motor magnet 4950 are sequentially operated. The operation of the motor magnet 4950 conditions the wipers controlled thereby for movement into engagement with the contacts forming the thirty-fourth stepping position of the switch 5100. The operation of the switch relay 5010 interconnects the stepping switch 5100 with the decoding relay circuit 7000 so that the decoding relay 6900 is operated by the ground applied through the wiper 6230 and the closed contacts 6905. The operation of the decoding relay 6900 prepares an operating path for a selected permutation slide operating magnet in the internal printer control circuit 7100 as shown in Fig. 14 of the drawings.

As the clutch cam 7190 approaches its normal position, the contacts 7250 are closed to operate the clutch magnet 7180 and the permutation slide operating magnet 7160. The operation of the clutch magnet 7180 initiates an additional cycle of rotation of the drive roll. The operation of the magnet 7160 selects a type bar bearing the numerical character "6".

During the next ensuing cycle of rotation of the drive roll, the selected type bar is moved into engagement with the paper tape to print the numerical character "6" immediately following the previously printed character "2". The printing of the character "6" completes the printing of the designation of the elapsed time of the toll call and the sixth line of printing, which includes the digits "26" representing the length of the toll call to which this ticket pertains was 26 minutes.

During the cycle of rotation in which the numerical character "6" is printed, the read cam 7260 moves beyond its normal position to open the contacts 7261 thereby initiating sequential release of the switch relay 5010 and the motor magnet 4950. The release of the switch relay 5010 disconnects the stepping switch 5100 from the decoding relay circuit 7000 so that the previously operated relay therein and also the magnets in the internal printer control circuit 7100 are released. The release of the motor magnet 4950 moves the wipers controlled thereby into engagement with the contacts forming the thirty-fourth stepping position. As shown in Figs. 2 and 3 of the drawings, the thirty-fourth contacts in the second and fourth contact decks 5800 and 5840, respectively, are wired directly to ground to provide a carriage return code.

After the read cam 7260 has rotated through approximately 90°, the contacts 7261 are reclosed to sequentially operate the switch relay 5010 and the motor magnet 4950. The operation of the motor magnet 4950 conditions the wipers controlled thereby for movement into engagement with the contacts forming the thirty-fifth stepping position of the switch 5100. The operation of the switch relay 5010 interconnects the wipers of the stepping switch 5100 with the operating windings of the decoding relays forming the circuit 7000 so that the decoding relays 6710 and 6730 are operated to close the contacts controlled thereby. The closure of the contacts controlled by these two relays conditions the internal printer control circuit 7100 to initiate a carriage return operation during the next succeeding cycle of rotation of the drive roll.

As the clutch cam 7190 approaches the termination of the cycle of rotation during which the numerical character "6" is printed, the contacts 7250 are closed to operate the magnets 7120, 7140 and the clutch magnet 7180. The operation of the clutch magnet 7180 initiates an additional cycle of rotation of the drive roll in the printer. The simultaneous operation of the magnets 7120 and 7140 conditions the printer for a carriage return operation. During the next succeeding cycle of rotation of the drive roll, the movable carriage of the printer executes a carriage return movement following which three separate line feed operations are performed. The interposition of this carriage return operation following the production of the sixth line of printing on the toll ticket 7900 returns the carriage of the printer to its left marginal position so that all of the lines of printing are initiated at the same position and also interposes adequate spacing between the sixth and seventh lines of printing produced on this ticket.

As the read cam 7260 moves beyond its normal position during the cycle of rotation in which the carriage return operation is executed, the contacts 7261 are opened to sequentially release the switch relay 5010 and the motor magnet 4950. The release of the switch relay 5010 disconnects the stepping switch 5100 from the decoding relay circuit 7000 so that the relays 6710, 6730 and the magnets 7120, 7140 and 7180 are released. The release of the motor magnet 4950 moves the wipers controlled thereby into engagement with the contacts forming the thirty-fifth stepping position. As shown in Fig. 16 of the drawings, the contacts forming the thirty-fifth stepping position are connected to the output anodes of the tubes forming the units dollars counting chain in the cost computer 39. Assuming the charge for this toll call is $1.15, the "1" manifesting tube in the units dollars counting chain is rendered conductive under the control of the ninth group of mark pulses and rate information from destination relay circuit 2150.

Following approximately one-quarter of a revolution, the read cam 7260 recloses the contacts 7261 so that the switch relay 5010 and the motor magnet 4950 are sequentially operated. The operation of the motor magnet 4950 conditions the wipers controlled thereby for movement into engagement with the contacts forming the thirty-sixth stepping position. The operation of the switch relay 5010 interconnects the decoding relay circuit 7000 with the stepping switch 5100 so that the ground applied to the thirty-fifth contact in the contact bank 5440 is applied through the wiper 5450 and the closed contacts 6750 to operate the decoding relay 6700. The operation of the decoding relay 6700 conditions a circuit for operating the permutation slide operating magnet 7110 in the internal printer control circuit 7100.

As the clutch cam 7190 returns to its normal position at the end of the cycle of rotation during which the carriage return operation is performed by the printer, and, assuming that the line feed relay 7200 has been released so that the contacts 7201 are closed, this movement of the clutch cam 7190 closes the contacts 7250 to operate the magnets 7110 and 7180. The operation of the magnet 7180 reengages the one-revolution clutch so that an additional cycle of rotation of the drive roll is initiated. The operation of the magnet 7110 releases the permutation slide controlled thereby so that a type bar bearing the numerical character "1" is selected for actuation during the next cycle of rotation.

During this next cycle of rotation, the drive roll moves the selected type bar into engagement with the paper tape to initiate the printing of the seventh line on the toll ticket. Also during this cycle, as the read cam 7260 moves beyond its normal position, the contacts 7261 are opened to initiate the sequential release of the switch relay 5010 and the motor magnet 4950. The release of the switch relay 5010 disconnects the stepping switch 5100 from the decoding relay circuit 7000 so that the relay 6700 and the magnets 7110 and 7180 are released. The release of the motor magnet 4950 advances the wipers controlled thereby into engagement with the contacts forming the thirty-sixth stepping position. As shown in Fig. 16 of the drawings, the thirty-sixth contacts in the first and fourth contact banks 5440 and 5840 are wired directly to ground. The grounding of these contacts represents the character "–".

After the read cam 7260 is rotated through approximately 90° during the cycle of rotation in which the numerical character "1" is printed, the contacts 7261 are closed to initiate sequential operation of the switch relay 5010 and the motor magnet 4950. The operation of the motor magnet 4950 conditions the wipers controlled thereby for movement into engagement with the contacts forming the thirty-seventh stepping position. The operation of the switch relay 5010 interconnects the wipers of the decoding relays in the circuit 7000 so that the relays 6700 and 6730 are operated in response to the ground applied to the wipers 5450 and 5850, respectively. The operation of these two relays, as described hereinabove, conditions the internal printer control circuit 7100 for selecting a type bar bearing the character "–". When the clutch cam 7190 next approaches its normal position, the contacts 7250 are closed to operate the selected magnets in the internal printer control circuit 7100 thereby selecting the type bar bearing the character "–" and to operate the clutch magnet 7180. The operation of the clutch magnet 7180 initiates an additional cycle of rotation of the drive roll.

During this additional cycle of rotation, the selected type bar is moved into engagement with the paper tape immediately following the previously printed character "1". This dash separates the units dollar portion of the charge to be assessed for the toll call from the tens and units cents portion thereof. As the read cam 7260 moves beyond its normal position during this cycle of rotation, the contacts 7261 are opened sequentially to release the switch relay 5010 and the motor magnet 4950. The release of the switch relay 5010 disconnects the decoding relay circuit 7000 from the wipers of the stepping switch 5100 so that the previously operated relays therein and also the operated magnets in the internal printer control circuit 7100 are released. The release of the motor magnet 4950 moves the wipers controlled thereby into engagement with the contacts forming the thirty-seventh stepping position. As shown in Fig. 16 of the drawings the contacts forming the thirty-seventh stepping position are directly connected to the output anodes of the plurality of tubes forming the tens cents ring-connected counting chain in the cost computer 39. The "1" manifesting tube in this counting ring is rendered conductive under the control of the ninth group of mark pulses and the rate information from destination relay circuit 2150.

Accordingly, when the read cam 7260 recloses the contacts 7261 to sequentially operate the switch relay 5010 and the motor magnet 4950, the decoding relay 6700 is operated by the ground applied from the wiper 5450 through the closed contacts 6715. The operation of the decoding relay 6700 (Fig. 14) conditions the internal printer control circuit 7100 for the selection of a type bar bearing the numerical character "1". The operation of the motor magnet 4950 conditions the wipers controlled thereby for movement into engagement with the contacts forming the thirty-eighth stepping position of the switch 5100.

When the clutch cam 7190 approaches the end of the cycle of rotation during which the "–" is printed, the contacts 7250 are closed to operate the conditioned magnets in the internal printer control circuit 7100 and, also, the clutch magnet 7180. The operation of the conditioned magnet selects a type bar bearing the numerical character "1". The operation of the clutch magnet 7180 reengages the one-revolution clutch so that the drive roll is driven through an additional cycle of rotation.

During this cycle of rotation, the selected type bar is moved into engagement with the paper tape immediately following the previously printed "–" to print the numerical character "1" to represent the tens cents digit of the charge to be assessed for this call. Also, during the original movement of this next cycle of rotation, the read cam 7260 opens the contacts 7261 so that the switch relay 5010 and the motor magnet 4950 are sequentially released. The release of the switch relay 5010 disconnects the stepping switch 5100 from the decoding relay circuit 7000 so that the relays therein and the magnets in the internal printer control circuit 7100 are released. The release of the motor magnet 4950 moves the wipers controlled thereby into engagement with the contacts forming the thirty-eighth stepping position. As shown in Fig. 16 of the drawings, only the contacts in the fifth and the last contact banks 6220 and 6640 are connected to the output anodes of the "5" and "0" manifesting tubes in the units cents ring-connected counting chain in the cost computer 39. This counting chain is operated under the control of the ninth group of mark pulses and rate information from destination relay circuit 2150 so that the "5" manifesting tube is rendered conductive.

Accordingly, when the contacts 7261 are next closed sequentially to operate the switch relay 5010 and the motor magnet 4950, ground is applied through the wiper 6210 and the closed contacts 6945 to operate the decoding relay 6740. The operation of the decoding relay 6740 conditions the internal printer control circuit 7100 for selecting a type bar bearing the numerical character "5". The operation of the motor magnet 4950 following the operation of the switch relay 5010 conditions the wipers controlled thereby for movement into engagement with the contacts forming the thirty-ninth stepping position.

The following closure of the contacts 7250 operates the conditioned magnets in the internal printer control circuit 7100 and the clutch magnet 7180 to initiate an additional cycle of rotation of the drive roll. The operation of the selected magnets in the control circuit 7100 selects a type bar bearing the numerical character "5". During this newly initiated cycle of rotation, the selected type bar is moved into engagement with the paper tape immediately following the previously printed character "1" to print the character "5". The printing of the character "5" completes the printing of the seventh line of information on the toll ticket and includes "1-15" which is the printed representation of the charge to be assessed for the toll call, i.e., $1.15. This charge includes the units dollars digit which is separated from the tens and units cents portion of the cost by a dash.

As the read cam 7260 moves beyond its normal position, the contacts 7261 are opened to sequentially release the switch relay 5010 and the motor magnet 4950. The release of the switch relay 5010 disconnects the decoding relay circuit 7000 from the stepping switch 5100 so that the operated relay therein and the operated magnets in the internal printer control circuit 7100 are released. The release of the motor magnet 4950 moves the wipers controlled thereby into engagement with the contacts forming the thirty-ninth stepping position of the switch 5100. As shown in Fig. 16 of the drawings, the thirty-ninth contacts in the second and fourth contact banks 5800 and 5840 are wired directly to ground to provide a carriage return code. When the read cam 7260 again closes the contacts 7261 to sequentially operate the switch relay 5010 and the motor magnet 4950, the ground applied through the wipers 5810 and 5850 operates the decoding relays 6710 and 6730 thereby to condition the internal printer control circuit 7100 for controlling a carriage return operation of the printer. The operation of the motor magnet 4950 which accompanies the interconnection of the decoding relay circuit 7000 with the stepping switch 5100 conditions the wipers controlled thereby for movement into engagement with the contacts forming the fortieth stepping position.

The following closure of the clutch contacts 7250 operates the selected magnets 7120 and 7140 and the clutch magnet 7180 in the internal printer control circuits 7100. The operation of the magnets 7120 and 7140 releases the permutation slides controlled thereby so that a carriage return operation of the printer is initiated. The operation of the magnet 7180 reengages the one-revolution clutch so that the drive roll is driven to an additional cycle of rotation. During this additional cycle of rotation, the movable carriage of the printer is returned to its left marginal position and thereafter advances the paper tape through three line feed operations during which the line feed relay 7200 is maintained operated to disable the internal printer control circuit 7100 from initiating an additional printing cycle until such time as the line feed operations have been completed.

As shown in Fig. 16 of the drawings, the contacts forming the fortieth and forty-first stepping positions include contacts in the second and fourth contact banks 5800 and 5840 which are wired directly to ground to provide carriage return codes. Accordingly, during the next two cycles of rotation of the drive roll two carriage return operations are carried out by the printer under the control of the contacts forming the fortieth and forty-first stepping positions.

At the beginning of the cycle of rotation in which the carriage return operation is controlled by the contacts forming the forty-first stepping position, the movement of the read cam 7260 beyond its normal position opens the contacts 7261 to sequentially release the switch relay 5010 and the motor magnet 4950. The release of the switch relay 5010 disconnects the wipers of the stepping switch 5100 from the operating windings of the decoding relay circuit 7000 so that the relays therein and the magnets in the internal printer control circuit 7100 operated under the control of the contacts forming the forty-first stepping position are released. The release of the motor magnet 4950 moves the wipers controlled thereby into engagement with the contacts forming the forty-second stepping position. As shown in Figs. 2 and 16 of the drawings, in the forty-second stepping position, none of the contacts forming the contact banks 5440, 5800, 5820, 5840, 6200, 6220, 6240, 6600, 6620 and 6640 are connected to ground. However, the forty-second contact in the contact bank 5420 is connected directly to printing control circuit 35. The wiper 5430 which engages the contacts forming the banks 5420 is connected directly to the contacts 5011 controlled by the switch relay 5010. Since these contacts are now open, ground is not applied to the wiper 5430.

After the read cam 7260 has rotated through approximately 90° of the cycle of rotation during which the carriage return operation initiated by the contacts forming the forty-first stepping position is executed, the contacts 7261 are reclosed. The closure of the contacts 7261 sequentially operates the switch relay 5010 and the motor magnet 4950. The operation of the motor magnet 4950 conditions the wipers controlled thereby for movement into engagement with the contacts forming the first stepping position of the switch 5100. The operation of the switch relay 5010 interconnects the wipers of the stepping switch 5100 with the operating windings of the decoding relay circuit 7000. However, the interconnection of the stepping switch 5100 with the circuit 7000 is without effect at this time inasmuch as none of the wipers associated with the contact banks one to nine, inclusive, and zero are grounded. However, the closure of the contacts 5011 applies ground through the wiper 5430 and the forty-second contact in the bank 5420 to printing control circuit 35, which in response thereto, initiates a resetting and priming operation of storage chains 38, steering circuit 37 and cost computer 39.

As the cams 7190 and 7260 return to their normal position, the contacts 7250 are closed. The closure of the contacts 7250 does not operate any of the magnets in the internal printer control circuit 7100 inasmuch as none of the decoding relays in the decoding relay circuit 7000 have been operated under the control of the contacts forming the forty-second stepping position of the switch 5100. Therefore, since the one-revolution clutch magnet 7180 is not operated, the clutch cam 7190 and the read cam 7260 stop in their normal positions as shown in Figs. 10 and 11 of the drawings. Since the read cam 7260 stops in its normal position the contacts 7261 are held closed so that the switch relay 5010 and the motor magnet 4950 remain operated. In the operated condition of the motor magnet 4950, the wipers of the stepping switch 5100 are conditioned for movement into engagement with the contacts forming the first stepping position but are in engagement with the contacts forming the forty-second stepping position. However, incident to the resetting operation initiated by printing control circuit 35, ground is removed from conductors 101 and 102 of cable 100 to restore first and second prepare-to-read relays 5020 and 5030 and, accordingly, the switch relay 5010 and the motor magnet 4950 are thereby released, so that the wipers are then moved into engagement with the contacts forming the first stepping position to condition the stepping switch 5100 for another cycle of operation identical to that described hereinabove wherein information relating to a second toll call is transferred to the printer to control the operation of this printer to produce a toll ticket relating to a second toll call.

The interposition of the three carriage return operations following the production of the seventh line of printed information on the toll ticket provides a space equal to nine lines on the toll ticket immediately following the last printed line to space the end of the toll ticket from the last printed line.

In summary, the printing control circuit 35, during the portion of its cycle of operation in which the toll ticket is printed, sequentially advances the stepping switch 5100 to engage the contacts forming successive stepping positions so that the items of information provided by the destination relay circuit 2150, the cost computer 39, and the plurality of storage chains 38 are sequentially transmitted to the internal printer control circuit 7100 to control the operation of the printer. During each cycle of operation, the printer prints the previously established item transmitted from the stepping switch 5100 while the decoding relay circuit 7000 is selectively operated to establish the next item of information which is to be printed on the next succeeding cycle of operation. The sequential operation of the printer under the control of the decoding relay circuit 7000 is terminated after forty-two stepping operations of the switch 5100 by completing a circuit through the auxiliary bank of contacts 5420 to operate the reset means of printing control circuit 35.

Although only a preferred embodiment of the present invention has been described in detail herein, it is not intended that the invention be restricted thereto, but that the invention be limited only by the scope of the appended claims.

What is claimed is:

1. In combination with a typewriting machine having a plurality of type actions; automatic control means operable through successive steps to cause successive type action operations in accordance with a predetermined program; a plurality of solenoids for controlling selective sequential operation of said type actions; switch means common to said solenoids and operable to opened and closed conditions for each operation of a type action; means controlled by said switch means when said switch means are operated to an opened condition for operating said automatic control means to advance a step to prepare said solenoids for controlling a subsequent operation of a selected type action; a power source; and means including said power source, said switch means, and said solenoids for causing said subsequent operation of a type action when said switch means are operated to a closed condition.

2. In combination with a typewriting machine including means for performing character printing operations, a plurality of solenoids for controlling the performance of character printing operations by said typewriting machine, first switch means in said machine operable to alternate opened and closed conditions in response to the performance of each character printing operation by said machine, second switch means operable to a plurality of successive settings representing successive characters to be printed by said machine, and means including said first switch means for selectively operating said solenoids to condition said machine for printing a selected character when said first switch means are in one of said alternate conditions and for operating said second switch means to advance said second switch means when said first switch means are in the other of said alternate conditions.

3. In a recorder control system including an electrically operated printing mechanism having a plurality of individual type actions driven by a common rotatable element, the combination comprising a plurality of solenoids for selecting one of said type actions for actuation by said rotatable element, a plurality of individual character registers, switching means progressively operable to different successive settings to render different ones of said registers effective to control said plurality of solenoids in a fixed sequence, cam means rotatable in synchronism with said rotatable element, switch means controlled by said cam means, first means controlled by said switch means for operating said switching means to said successive settings, and second means controlled by said switch means for rendering said plurality of solenoids responsive to control by the one of the registers rendered effective by said switching means.

4. In a recorder control system including an electrically operated printing mechanism having a plurality of individual type actions driven by a common rotatable element, the combination comprising a plurality of solenoids for selecting one of said type actions for actuation by said rotatable element, a plurality of relays for controlling the operation of said plurality of solenoids, a plurality of individual character registers, switching means progressively operable to different successive settings to render different ones of said registers effective to control said plurality of relays in a fixed sequence, cam means rotatable in synchronism with said rotatable element, switch means controlled by said cam means, and control means cntrolled by said switch means for operating said switching means to said successive settings and for rendering said plurality of relays effective to control said plurality of solenoids.

5. In a recorder control system, a recorder for recording alphabetical and numerical characters, a plurality of individually operable control devices for controlling the operation of said recorder, a plurality of register means adapted to store alphabetical and numerical characters, switching means for individually connecting said plurality of control devices to different ones of said register means in sequence, and circuit means including said switching means for operating only one of said control devices when said plurality of control devices is connected to a register means storing a numerical character and for operating more than one of said plurality of control devices when said plurality of control devices is connected to a register means storing an alphabetical character.

6. The recorder control system set forth in claim 5 in which at least one of said register means is adapted to store a representation of a control function to be performed by said recorder and in which said circuit means includes means for operating more than one of said control devices when said plurality of control devices is connected to said one register means.

7. In a recorder control system; a recorder for recording alphabetical and numerical characters; ten individually operable control devices controlling the operation of said recorder; a plurality of register means adapted to store alphabetical and numerical characters; switching means for individually connecting each of said register means in sequence to said ten control devices, said switching means including ten output leads each controlling one of said control devices and each representing one of the digits "1"–"9" and "0"; and circuit means including said switching means for applying a control signal to one of said ten output leads to operate only one of said ten control devices when a numerical character is stored in the register means connected to the ten control devices and for applying a control signal to more than one of said ten output leads to operate more than one of said control devices when an alphabetical character is stored in the register means connected to said ten control devices.

References Cited in the file of this patent
UNITED STATES PATENTS 2,313,752    Le Clair _____ Mar. 16, 1943